United States Patent
Ng et al.

(10) Patent No.: US 10,180,240 B2
(45) Date of Patent: Jan. 15, 2019

(54) ILLUMINATION DEVICES WITH ADJUSTABLE OPTICAL ELEMENTS

(71) Applicant: Quarkstar LLC, Las Vegas, NV (US)

(72) Inventors: Andrew Tien-Man Ng, Coquitlam (CA); Ingo Speier, Saanichton (CA); Wilson Dau, Victoria (CA); Louis Lerman, Las Vegas, NV (US); Hans Peter Stormberg, Stolberg (DE)

(73) Assignee: Quarkstar LLC, Las Vegas, NV (US)

( * ) Notice: Subject to any disclaimer, the term of this patent is extended or adjusted under 35 U.S.C. 154(b) by 79 days.

(21) Appl. No.: 15/231,644

(22) Filed: Aug. 8, 2016

(65) Prior Publication Data
US 2017/0038041 A1 Feb. 9, 2017

Related U.S. Application Data

(63) Continuation of application No. 14/418,194, filed as application No. PCT/US2014/034555 on Apr. 17, 2014, now Pat. No. 9,410,680.
(Continued)

(51) Int. Cl.
*F21S 8/04* (2006.01)
*F21V 19/02* (2006.01)
(Continued)

(52) U.S. Cl.
CPC ............... *F21V 19/02* (2013.01); *F21K 9/23* (2016.08); *F21S 6/002* (2013.01); *F21S 6/007* (2013.01); *F21S 8/026* (2013.01); *F21V 7/0008* (2013.01); *F21V 13/04* (2013.01); *F21V 14/02* (2013.01); *F21V 14/04* (2013.01); *F21V 23/06* (2013.01); *G02B 5/0278* (2013.01); *G02B 5/0284* (2013.01); *G02B 6/003* (2013.01);
(Continued)

(58) Field of Classification Search
CPC .. F21S 6/007; F21S 8/026; F21S 8/028; F21S 8/038; F21S 8/04; F21V 7/0008; G02B 6/0023; G02B 6/003
USPC .................. 362/217.05, 217.12, 217.16, 223
See application file for complete search history.

(56) References Cited

U.S. PATENT DOCUMENTS 2,194,841 A 3/1940 Welch
2,626,120 A 1/1953 Baker
(Continued)

FOREIGN PATENT DOCUMENTS

CA 2 702 690 11/2010
DE 199 17 401 10/2000
(Continued)

OTHER PUBLICATIONS

Authorized Officer Blaine R. Copenheaver, Notification of Transmittal of the International Search Report and the Written Opinion of the International Searching Authority, International Application No. PCT/US2013/059416, dated Feb. 19, 2014, 9 pages.
(Continued)

*Primary Examiner* — Julie A Bannan
(74) *Attorney, Agent, or Firm* — Fish & Richardson P.C.

(57) ABSTRACT

Illumination devices with adjustable optical elements configured to provide a variable illumination pattern of an area are described. The adjustable optical elements of the illumination devices can be traversed relative to a surface (e.g., a ceiling of a room) to vary the light distribution and/or intensity to the surface.

12 Claims, 19 Drawing Sheets

Related U.S. Application Data

(60) Provisional application No. 61/814,145, filed on Apr. 19, 2013.

(51) Int. Cl.

| | | |
|---|---|---|
| *F21S 8/02* | (2006.01) | |
| *F21V 7/00* | (2006.01) | |
| *F21V 14/04* | (2006.01) | |
| *F21V 8/00* | (2006.01) | |
| *F21S 6/00* | (2006.01) | |
| *F21V 13/04* | (2006.01) | |
| *F21V 14/02* | (2006.01) | |
| *F21V 23/06* | (2006.01) | |
| *F21K 9/23* | (2016.01) | |
| *G02B 5/02* | (2006.01) | |
| *G02B 27/30* | (2006.01) | |
| *F21K 9/61* | (2016.01) | |
| *F21Y 103/10* | (2016.01) | |
| *F21Y 115/10* | (2016.01) | |
| *F21Y 101/00* | (2016.01) | |

(52) U.S. Cl.
CPC ......... *G02B 6/0023* (2013.01); *G02B 6/0028* (2013.01); *G02B 6/0045* (2013.01); *G02B 6/0051* (2013.01); *G02B 6/0055* (2013.01); *G02B 6/0096* (2013.01); *G02B 27/30* (2013.01); *F21K 9/61* (2016.08); *F21S 6/008* (2013.01); *F21V 7/0016* (2013.01); *F21Y 2101/00* (2013.01); *F21Y 2103/10* (2016.08); *F21Y 2115/10* (2016.08)

(56) References Cited

U.S. PATENT DOCUMENTS

| | | | |
|---|---|---|---|
| 3,772,506 A | 11/1973 | Junginger | |
| 3,836,767 A | 9/1974 | Lasker | |
| 4,112,483 A | 9/1978 | Small et al. | |
| 4,240,692 A | 12/1980 | Winston | |
| 4,254,456 A | 3/1981 | Grindle et al. | |
| 4,271,408 A | 6/1981 | Teshima et al. | |
| 4,358,817 A | 11/1982 | Bielemeier | |
| 5,075,827 A | 12/1991 | Smith | |
| 5,134,550 A | 7/1992 | Young | |
| 5,289,356 A | 2/1994 | Winston | |
| 5,436,805 A | 7/1995 | Hsu et al. | |
| 5,438,485 A | 8/1995 | Li et al. | |
| 5,810,463 A | 9/1998 | Kawahara et al. | |
| 5,868,489 A | 2/1999 | Fuller et al. | |
| 5,984,486 A * | 11/1999 | Munz | F21V 21/02 |
| | | | 211/153 |
| 5,988,836 A | 11/1999 | Sawarens | |
| 6,058,271 A | 5/2000 | Tenmyo | |
| 6,234,643 B1 | 5/2001 | Lichon | |
| 6,241,369 B1 | 6/2001 | Mackiewicz | |
| 6,273,577 B1 | 8/2001 | Goto et al. | |
| 6,350,041 B1 | 2/2002 | Tarsa et al. | |
| 6,441,943 B1 | 8/2002 | Roberts et al. | |
| 6,505,953 B1 | 1/2003 | Dahlen | |
| 6,527,420 B1 | 3/2003 | Chuang | |
| 6,540,373 B2 | 4/2003 | Bailey | |
| 6,543,911 B1 | 4/2003 | Rizkin et al. | |
| 6,572,246 B1 | 6/2003 | Hopp et al. | |
| 6,598,998 B2 | 7/2003 | West et al. | |
| 6,834,979 B1 | 12/2004 | Cleaver et al. | |
| 6,880,963 B2 | 4/2005 | Luig et al. | |
| 6,932,499 B2 | 8/2005 | Ogura | |
| 7,083,315 B2 | 8/2006 | Hansler et al. | |
| 7,097,337 B2 | 8/2006 | Kim et al. | |
| 7,142,769 B2 | 11/2006 | Hsieh | |
| 7,156,540 B2 | 1/2007 | Haines | |
| 7,164,842 B2 | 1/2007 | Chen | |
| 7,182,480 B2 | 2/2007 | Kan | |
| 7,201,509 B2 * | 4/2007 | Erber | F21S 43/40 |
| | | | 362/560 |
| 7,259,403 B2 | 8/2007 | Shimizu et al. | |
| 7,275,841 B2 | 10/2007 | Kelly | |
| 7,286,296 B2 | 10/2007 | Chaves et al. | |
| 7,290,906 B2 | 11/2007 | Suzuki et al. | |
| 7,293,889 B2 | 11/2007 | Kamiya | |
| 7,331,691 B2 | 2/2008 | Livesay et al. | |
| 7,334,932 B2 | 2/2008 | Klettke | |
| 7,341,358 B2 | 3/2008 | Hsieh et al. | |
| 7,386,214 B1 | 6/2008 | Canciotto | |
| 7,387,399 B2 | 6/2008 | Noh et al. | |
| 7,434,951 B2 | 10/2008 | Bienick | |
| 7,530,712 B2 | 5/2009 | Lin et al. | |
| 7,645,054 B2 | 1/2010 | Goihl | |
| 7,850,347 B2 | 12/2010 | Speier et al. | |
| 7,855,815 B2 | 12/2010 | Hayashide et al. | |
| 7,942,546 B2 | 5/2011 | Naijo et al. | |
| 7,947,915 B2 | 5/2011 | Lee et al. | |
| 7,967,477 B2 | 6/2011 | Bloemen et al. | |
| 8,002,446 B1 | 8/2011 | Plunk et al. | |
| 8,006,453 B2 | 8/2011 | Anderson | |
| 8,042,968 B2 | 10/2011 | Boyer et al. | |
| 8,061,867 B2 | 11/2011 | Kim et al. | |
| 8,068,707 B1 | 11/2011 | Simon | |
| 8,075,147 B2 * | 12/2011 | Chaves | F21K 9/61 |
| | | | 362/235 |
| 8,192,051 B2 | 6/2012 | Dau et al. | |
| 8,348,489 B2 | 1/2013 | Holman et al. | |
| 8,523,407 B2 * | 9/2013 | Huang | F21K 9/61 |
| | | | 362/327 |
| 8,573,823 B2 | 11/2013 | Dau | |
| 8,740,407 B2 | 6/2014 | Kotovsky et al. | |
| 2003/0117798 A1 | 6/2003 | Leysath | |
| 2004/0012976 A1 | 1/2004 | Amano | |
| 2004/0080947 A1 | 4/2004 | Subisak et al. | |
| 2004/0105264 A1 | 6/2004 | Spero | |
| 2004/0120160 A1 | 6/2004 | Natsume | |
| 2004/0137189 A1 | 7/2004 | Tellini et al. | |
| 2004/0208019 A1 | 10/2004 | Koizumi | |
| 2004/0228131 A1 | 11/2004 | Minano et al. | |
| 2004/0257803 A1 | 12/2004 | Kermoade | |
| 2005/0057922 A1 | 3/2005 | Herst et al. | |
| 2005/0063169 A1 | 3/2005 | Erber | |
| 2005/0111235 A1 | 5/2005 | Suzuki et al. | |
| 2005/0185416 A1 | 8/2005 | Lee et al. | |
| 2005/0207177 A1 | 9/2005 | Guy | |
| 2005/0243570 A1 | 11/2005 | Chaves et al. | |
| 2005/0265044 A1 | 12/2005 | Chen et al. | |
| 2005/0270774 A1 | 12/2005 | Pan | |
| 2006/0061990 A1 | 3/2006 | Chinniah et al. | |
| 2006/0076568 A1 | 4/2006 | Keller et al. | |
| 2006/0098444 A1 | 5/2006 | Petruzzi | |
| 2006/0139917 A1 | 6/2006 | Ward | |
| 2006/0164839 A1 | 7/2006 | Stefanov | |
| 2006/0187661 A1 | 8/2006 | Holten | |
| 2007/0047228 A1 | 3/2007 | Thompson et al. | |
| 2007/0061360 A1 | 3/2007 | Holcombe et al. | |
| 2007/0081360 A1 | 4/2007 | Bailey | |
| 2007/0097696 A1 | 5/2007 | Eng et al. | |
| 2007/0201234 A1 | 8/2007 | Ottermann | |
| 2007/0280593 A1 | 12/2007 | Brychell et al. | |
| 2008/0013317 A1 * | 1/2008 | Hinds | F21S 8/028 |
| | | | 362/286 |
| 2008/0074752 A1 | 3/2008 | Chaves et al. | |
| 2008/0080166 A1 | 4/2008 | Duong et al. | |
| 2008/0170398 A1 | 7/2008 | Kim | |
| 2008/0192458 A1 | 8/2008 | Li | |
| 2008/0198603 A1 | 8/2008 | Sormani et al. | |
| 2009/0103293 A1 | 4/2009 | Harbers et al. | |
| 2009/0168395 A1 | 7/2009 | Mrakovich et al. | |
| 2009/0201698 A1 | 8/2009 | Klick et al. | |
| 2009/0231831 A1 | 9/2009 | Hsiao | |
| 2009/0231878 A1 * | 9/2009 | Van Duijneveldt | |
| | | | G02B 6/0033 |
| | | | 362/555 |
| 2009/0316414 A1 | 12/2009 | Yang | |
| 2010/0085773 A1 | 4/2010 | Richardson | |
| 2010/0220497 A1 | 9/2010 | Ngai | |

(56) References Cited

U.S. PATENT DOCUMENTS

| | | |
|---|---|---|
| 2011/0063870 A1 | 3/2011 | Nomoto et al. |
| 2011/0103067 A1 | 5/2011 | Ago et al. |
| 2011/0164398 A1 | 7/2011 | Holten et al. |
| 2011/0175533 A1 | 7/2011 | Holman et al. |
| 2011/0182084 A1 | 7/2011 | Tomlinson |
| 2011/0199005 A1 | 8/2011 | Bretschneider et al. |
| 2011/0227487 A1 | 9/2011 | Nichol et al. |
| 2011/0234121 A1 | 9/2011 | Ding et al. |
| 2011/0235318 A1 | 9/2011 | Simon |
| 2011/0267836 A1 | 11/2011 | Boonekamp et al. |
| 2011/0273900 A1 | 11/2011 | Li et al. |
| 2011/0286200 A1 | 11/2011 | Iimura |
| 2012/0020066 A1 | 1/2012 | Chang |
| 2012/0044675 A1 | 2/2012 | Buelow et al. |
| 2012/0069595 A1 | 3/2012 | Catalano |
| 2012/0099310 A1 | 4/2012 | Kropac et al. |
| 2012/0147624 A1 | 6/2012 | Li et al. |
| 2012/0155110 A1 | 6/2012 | Pijlman et al. |
| 2012/0155116 A1 | 6/2012 | Gardner |
| 2012/0170260 A1 | 7/2012 | Gardner |
| 2012/0236586 A1 | 9/2012 | Wang |
| 2012/0250346 A1 | 10/2012 | Williams |
| 2012/0268966 A1 | 10/2012 | McCollum et al. |
| 2012/0281432 A1 | 11/2012 | Parker et al. |
| 2012/0294037 A1 | 11/2012 | Holman et al. |
| 2012/0314418 A1* | 12/2012 | Byrne .............. F21V 21/22 362/285 |
| 2013/0039090 A1 | 2/2013 | Dau |
| 2013/0208495 A1 | 8/2013 | Dau |
| 2013/0265764 A1* | 10/2013 | Holman ............ F21V 19/02 362/249.02 |
| 2013/0272015 A1 | 10/2013 | Weaver |

FOREIGN PATENT DOCUMENTS

| | | |
|---|---|---|
| DE | 10 2011 001769 | 10/2012 |
| EP | 1 182 395 | 2/2002 |
| EP | 2 163 701 | 3/2010 |
| EP | 2 196 725 | 6/2010 |
| EP | 2 264 359 | 12/2010 |
| EP | 2 439 564 | 4/2012 |
| FR | 2784739 | 4/2000 |
| FR | 2934353 | 1/2010 |
| WO | WO 2001/07828 | 2/2001 |
| WO | WO 2003/009012 | 1/2003 |
| WO | WO 2005/073629 | 8/2005 |
| WO | WO 2005/090854 | 9/2005 |
| WO | WO 2008/007315 | 1/2008 |
| WO | WO 2008/047278 | 4/2008 |
| WO | WO 2008/139383 | 11/2008 |
| WO | WO 2009/105168 | 8/2009 |
| WO | WO 2009150574 | 12/2009 |
| WO | WO 2010/079391 | 7/2010 |
| WO | WO 2010/113091 | 10/2010 |
| WO | WO 2011/112914 | 9/2011 |
| WO | WO 2012/093126 | 7/2012 |
| WO | WO 2012/131560 | 11/2012 |
| WO | WO 2012148384 | 11/2012 |
| WO | WO 2012/176352 | 12/2012 |
| WO | WO 2013/023008 | 2/2013 |
| WO | WO 2013/066822 | 5/2013 |
| WO | WO 2013/154835 | 10/2013 |

OTHER PUBLICATIONS

Authorized Officer Blaine R. Copenheaver, Notification of Transmittal of the International Search Report and the Written Opinion of the International Searching Authority, International Application No. PCT/US2014/015255, dated May 19, 2014, 12 pages.
Authorized Officer Shane Thomas, Notification of Transmittal of International Search Report and Written Opinion, International Application No. PCT/US14/15707, dated May 29, 2014, 21 pages.
Authorized Officer Shane Thomas, Notification of Transmittal of International Search Report and Written Opinion, International Application No. PCT/US14/27583, dated Jul. 24, 2014, 12 pages.
European Patent Application 14 731 419.9, Communication pursuant to Article 94(3) EPC, dated Apr. 26, 2016, 5 pages.
Notification of Transmittal of the International Search Report and the Written Opinion of the International Searching Authority, International Application No. PCT/US2014/034555, dated Nov. 27, 2014, 12 pages.
Supplementary European Search Report for European Patent Application No. 12822822.8, dated Jul. 4, 2014, 3 pages.
Thomas, "International Search Report and Written Opinion" from co-pending PCT Application No. PCT/US13/24525 dated Apr. 16, 2013, 16 pages.
Young, "International Search Report and Written Opinion" from co-pending PCT Application No. PCT/US12/50046 dated Oct. 26, 2012, 34 pages.
http://www.everlight.com/datasheets/OL-Flat_Series_Data_Sheet_v5.pdf, "Datasheet: Office Lighting Flat Luminaire Series", product catalog, Everlight, Issue No. DBM-0000054_v5, May 5, 2011, pp. 1-5.
Philips Lighting Company, "Philips EnduraLED Candle LED Lamps", Downloaded from the internet at: www.lighting.philips.com/us_en/browseliterature/download/p-6027 on Jan. 27, 2012, 2 pages (2010).

* cited by examiner

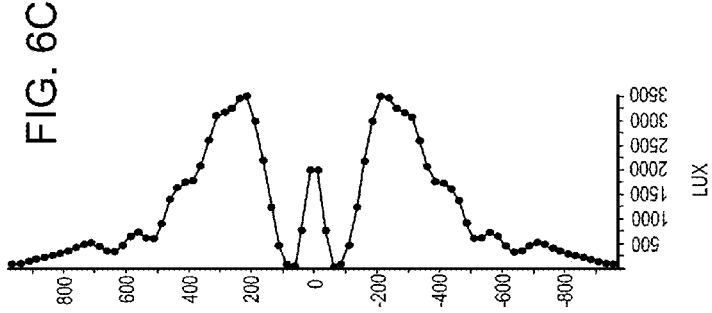
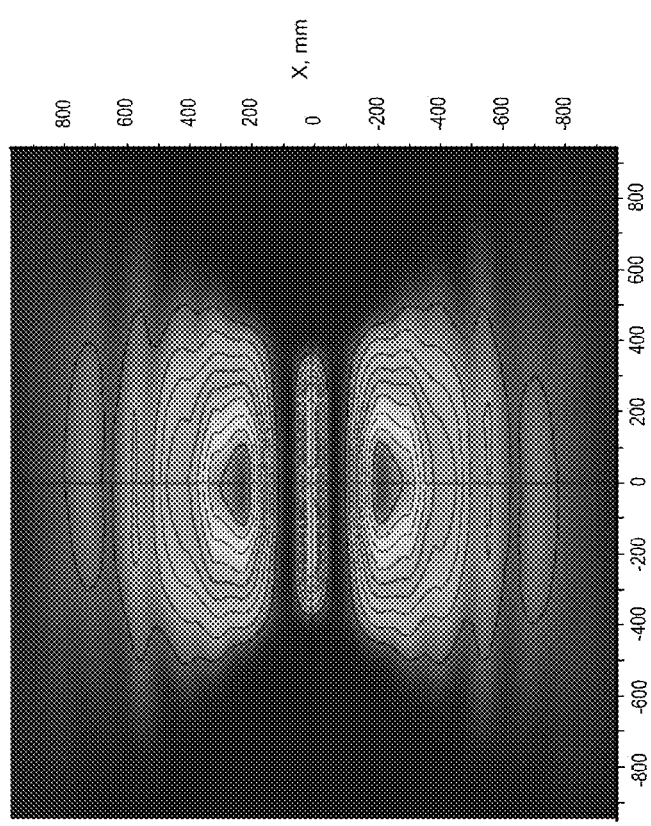
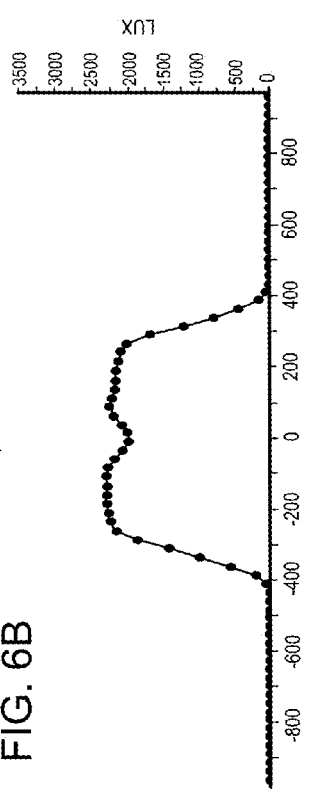

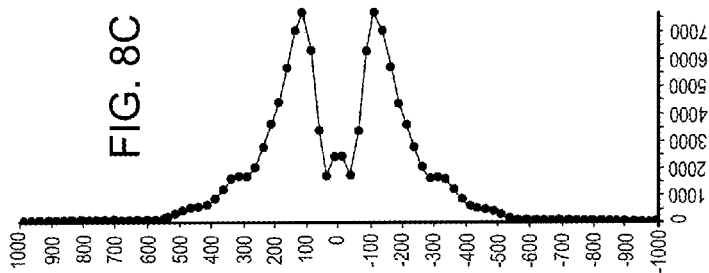
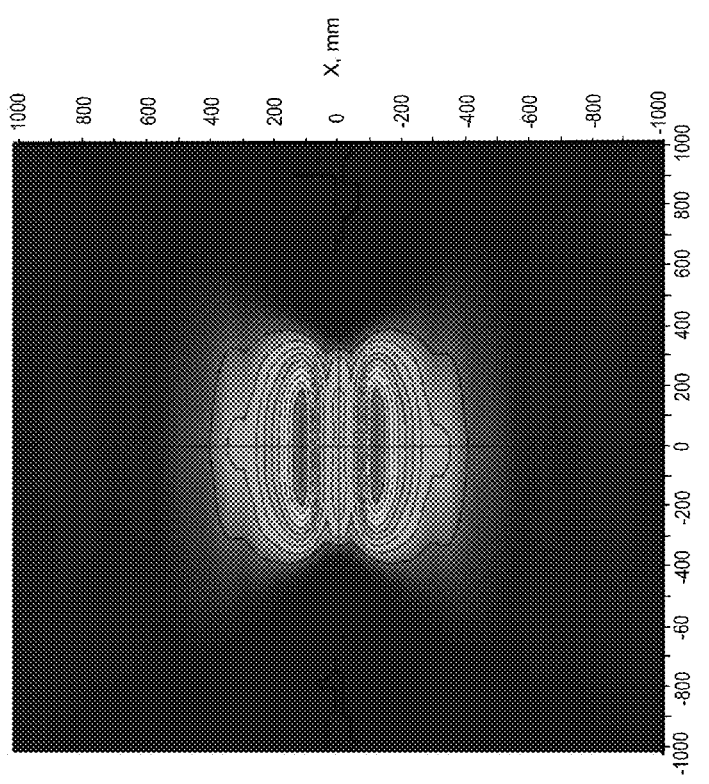
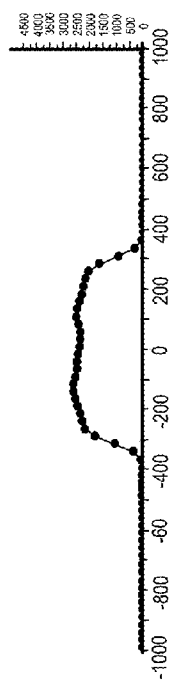

ILLUMINATION DEVICES WITH ADJUSTABLE OPTICAL ELEMENTS

CROSS-REFERENCE TO RELATED APPLICATION

This application is a continuation application of and claims priority to U.S. application Ser. No. 14/418,194, filed Jan. 29, 2015 (now U.S. Pat. No. 9,410,680), which is a U.S. National Stage of International Application No. PCT/US2014/034555, filed Apr. 17, 2014, which claims benefit under 35 U.S.C. § 119(e)(1) of U.S. Provisional Application No. 61/814,145, filed on Apr. 19, 2013, the entire contents of which are incorporated by reference herein.

TECHNICAL FIELD

The present disclosure relates to illumination devices with adjustable optical elements to provide a variable illumination pattern.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present disclosure relates to illumination devices with adjustable optical elements for providing variable illumination patterns, e.g., on a ceiling, walls, and/or a floor of a room. The position of the optical elements can be adjusted relative to a background area to which the adjustable illumination device can be mounted (e.g., a ceiling of a room) to vary the directionality of the light and/or the intensity of the light at the background area. While a variety of form factors are possible, in certain embodiments the ceiling-mounted devices may have low profiles. In certain embodiments, adjustable illumination devices may be suitable for retrofitting into existing light fixtures, such as existing recessed ceiling lights (e.g., cans or troffers). In some embodiments, the adjustable illumination devices may be floor lamps or desk lamps.

Accordingly, various aspects of the invention are summarized as follows.

In a general aspect 1, an illumination device comprises: a housing; an adjustable mount attached to the housing; and a luminaire module coupled to the housing via the adjustable mount, the luminaire module comprising: one or more light-emitting elements (LEEs) disposed on one or more substrates and adapted to emit light; one or more primary optics positioned to receive a portion of the light emitted by the LEEs and adapted to at least partially collimate the received light; and a secondary optic adapted to receive light from the one or more primary optics, the secondary optic having at least one redirecting surface, the at least one redirecting surface being adapted to reflect at least a portion of the light received at the secondary optic, wherein at least a portion of the luminaire module is recessed within the housing and the adjustable mount allows variable positioning of the secondary optic relative to the housing.

Aspect 2 according to aspect 1, wherein the housing comprises an opening and adjusting the position of the secondary optic relative to the housing comprises adjusting a position between the secondary optic and the opening.

Aspect 3 according to any one of aspects 1 to 2, wherein the housing comprises a mounting structure adapted to mount the illumination device in a ceiling so that varying the position of the illumination device relative to the housing varies a distance between the secondary optic and the ceiling.

Aspect 4 according to any one of aspects 1 to 3, wherein the adjustable mount comprises an electro-mechanical actuator adapted to move the luminaire module relative to the housing.

Aspect 5 according to any one of aspects 1 to 4, wherein the adjustable mount is a manually adjustable mount.

Aspect 6 according to any one of aspects 1 to 5, wherein the luminaire module further comprises: a light guide optically coupled at an input end of the light guide with the one or more primary optics, the light guide shaped to guide light received from the one or more primary optics to an output end of the light guide and provide guided light at the output end of the light guide, wherein the output end of the light guide is optically coupled to the secondary optic.

Aspect 7 according to any one of aspects 1 to 6, wherein the light guide has an elongated configuration.

Aspect 8 according to any one of aspects 1 to 7, wherein the secondary optic has an elongated configuration.

Aspect 9 according to any one of aspects 6 to 9, wherein the secondary optic comprises one or more output surfaces, and wherein the secondary optic directs light from the light guide towards the one or more output surfaces of the secondary optic.

Aspect 10 according to any one of aspects 1 to 9, wherein one or more of the at least one redirecting surface is at least partially reflective for light received from the one or more primary optics.

Aspect 11 according to aspect 10, wherein one or more of the at least one redirecting surface is partially transmissive for the light received from the one or more primary optics.

Aspect 12 according to any one of aspects 1 to 11, wherein one or more of the at least one redirecting surface reflects substantially all of the light received from the one or more primary optics.

Aspect 13 according to any one of aspects 1 to 12, further comprising a stand for supporting the housing during operation of the illumination device, preferably wherein the stand is a floor stand or a desk stand.

Aspect 14 according to any one of aspects 1 to 13, wherein the housing comprises a connector for connecting the illumination device to an Edison screw light socket or other standard light socket (e.g., a lamp mount defined in American National Standards Institute (ANSI) publications: ANSI C81.61, ANSI C81.62, ANSI C81.63, or ANSI C81.64 and/or in the following International Electrotechnical Commission (IEC) publications: IEC 60061-1, WC 60061-2, IEC 60061-3, or WC 60061-4).

Aspect 15 according to any one of aspects 1 to 14, wherein the adjustable mount is adapted to translate the luminaire module relative to the connector.

Aspect 16 according to any one of aspects 1 to 15, wherein the adjustable mount is adapted to rotate the luminaire module relative to the connector.

Aspect 17 according to any one of aspects 1 to 16, wherein the illumination device is sized to attach to a recessed can ceiling fixture.

Aspect 18 according to any one of aspects 1 to 17, wherein the one or more light-emitting elements are operatively disposed on the one or more substrates and are configured to emit light in a first angular range, wherein the one or more primary optics are optically coupled with the portion of the light emitted by the LEEs and wherein the one or more primary optics are configured to direct light in a second angular range, a divergence of the second angular range being smaller than a divergence of the first angular range.

Aspect 19 according to any one of aspects 1 to 18, wherein the housing includes a mounting assembly that is configured to mount the illumination device in a ceiling so that varying the position of the illumination device relative to the housing varies a distance between the secondary optic and the ceiling.

Aspect 20 according to any one of aspects 1 to 19, wherein the redirecting surface is at least partially reflective for light received from the one or more primary optics. For example, the redirecting surface can reflect about 50% or more (e.g., about 60% or more, about 70% or more, about 80% or more, about 90% or more) of incident light over at least a range (e.g., 50%, 60%, 70%, 80%, 90% or more of the energy spectrum) of visible wavelengths.

Aspect 21 according to any one of aspects 1 to 19, the redirecting surface reflects substantially all of the light received from the one or more primary optics. For example, the redirecting surface can reflect about 95% or more (e.g., about 97% or more, about 98% or more, 99% or more) of incident light over at least a range (e.g., 50%, 60%, 70%, 80%, 90% or more of the energy spectrum) of visible wavelengths.

Aspect 21 according to any one of aspects 1 to 20, wherein the redirecting surface is partially transmissive for the light received from the one or more primary optics. For example, the redirecting surface can transmit about 5% or more (e.g., about 10% or more, about 20% or more, about 30% or more, about 40% or more, about 50% or more, about 60% or more) of incident light over at least a range (e.g., 50%, 60%, 70%, 80%, 90%, or more of the energy spectrum) of visible wavelengths.

Among other advantages, embodiments of the present invention include improvements in space illumination. For example, embodiments can feature an adjustable illumination device that is adapted to provide varying illumination of one or more target areas (e.g., ceiling and/or floor,) by adjusting the position of a luminaire module included with the illumination device relative to the target area(s). As such, target areas of varying size may be illuminated indirectly via a ceiling or a wall by adjusting distances between luminaire modules and the ceilings/walls within a range of motion of the luminaire modules. Furthermore, illumination devices can be configured to illuminate one or more portions of ceilings and/or walls with certain uniformity within the range of motion depending on the distance between the luminaire modules and the ceilings/walls. As such, illumination from an illumination device can be adjusted to extend across a desired portion of the size of a ceiling or a wall and thereby fit needs of illumination of different sized rooms.

BRIEF DESCRIPTION OF THE DRAWINGS

FIGS. 6A-6D show an example of an adjustable illumination device with a fully extended luminaire module and corresponding illumination profiles.

FIGS. 8A-8D show an example of an adjustable illumination with a fully retracted luminaire module and corresponding illumination profiles.

Reference numbers and designations in the various drawings indicate exemplary aspects of implementations of particular features of the present disclosure.

DETAILED DESCRIPTION

The present disclosure relates to adjustable illumination devices configured to illuminate a target area, e.g., a floor of a room, a garage, etc. The adjustable illumination devices include light emitting elements (LEEs, such as, e.g., light emitting diodes, LEDs) and optics that are configured to provide direct illumination of the target area and indirect illumination towards a background area, e.g., away from the target area. In general, "direct" illumination refers to illumination that propagates directly from a luminaire module to the target area, while "indirect" illumination refers to illumination that reflects (e.g., diffusely reflects) from another surface, for example a ceiling, before illuminating the target area. In some implementations, the adjustable illumination device is configured to allow interdependent as well as independent control of the direct and indirect illuminations by a user.

The LEEs and optics are arranged as a rigid assembly that is adjustably attached to a housing allowing repositioning of the optics relative to the housing. However, the ceiling, floor, or other optical element positioned to receive light from the LEEs and optics remains fixed (hereinafter "fixed surface") with respect to the housing so that repositioning the LEEs and moveable optics changes the illumination at the fixed surface. In the context of this application "repositioning" or "variable positioning" of the secondary optic may be understood as changing (e.g., increasing or decreasing) the distance (e.g., by translation) between the secondary optic and the housing, changing (e.g., tilting) the angle between the optical axis of the luminaire module and the ceiling or floor of a room, and/or rotating (e.g., clockwise or counterclockwise) the secondary optic with respect to the optical axis of the luminaire module. The "adjustable mount" may correspondingly be understood as a translational mount, a rotatable mount and/or a tiltable mount. In exemplary embodiments, the rotation of the secondary optic or luminaire module may be 0-10°, preferable 0-20°, more preferably 0-30°, even more preferably 0-40°, most preferably 0-90°. In exemplary embodiments, the translation of the secondary optic or luminaire module may be 0-50 cm, preferably 0-30 cm, more preferably 1-30 cm, even more preferably 1-20 cm. In exemplary embodiments, the angular tilt of the secondary optic or luminaire module may be 0-10°, preferable 0-20°, more preferably 0-30°, even more preferably 0-45°.

Figure 1A:
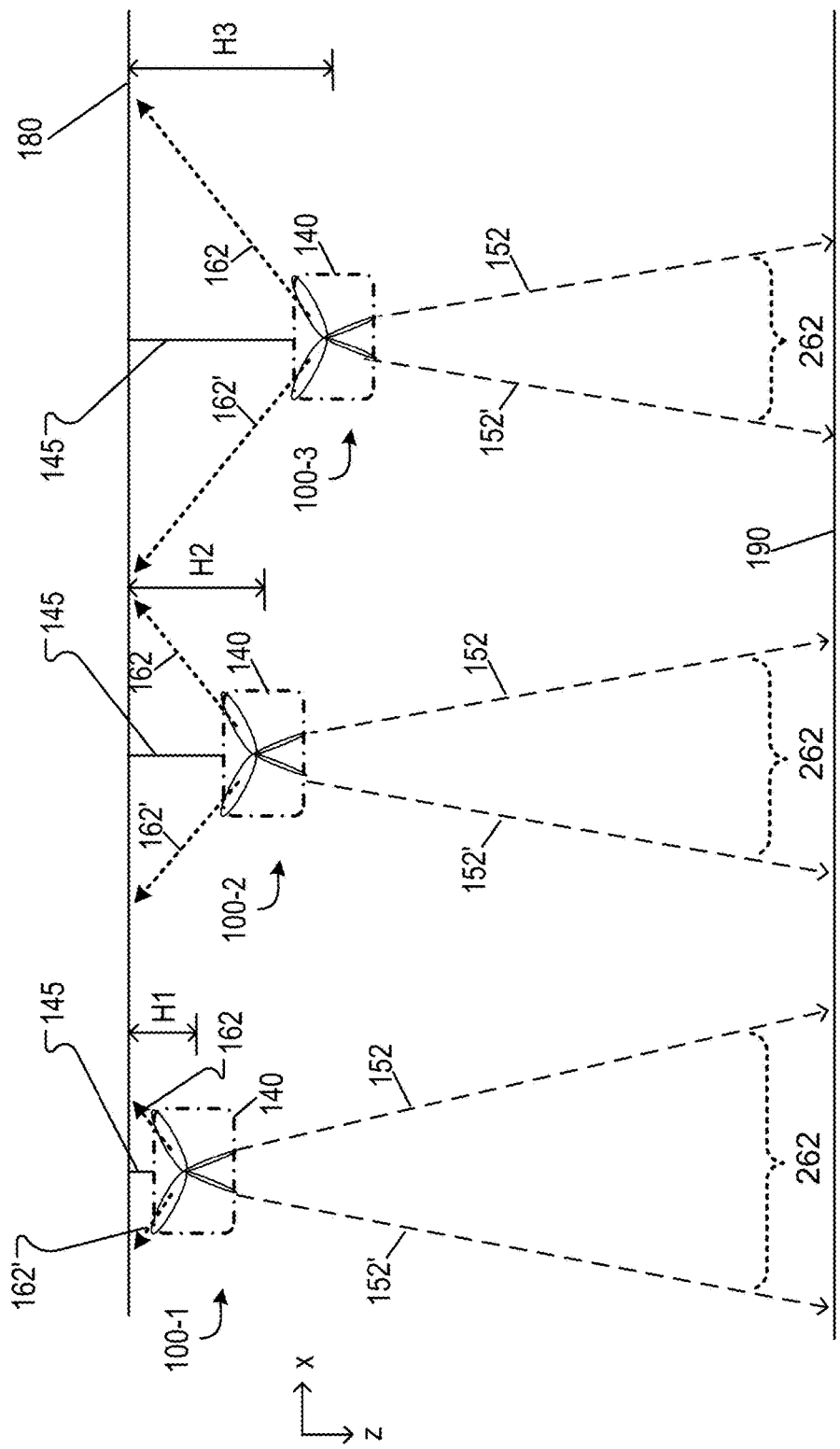
FIG. 1A is a schematic diagram showing three adjustable illumination devices with luminaire modules at different positions relative to a ceiling.

This principle is illustrated in FIG. 1A, which schematically shows three adjustable illumination devices 100-1, 100-2, and 100-3 mounted to a ceiling 180 of a room and configured to illuminate the room. Light output from the adjustable illumination devices 100-1, 100-2, and 100-3 occurs at different distances from ceiling 180. A Cartesian coordinate system is shown for reference. The x-y plane is parallel to the ceiling 180 and a floor 190 (e.g., a floor or a desk,) while the z-axis is perpendicular to both. In general, each adjustable illumination device includes one or more light emitting elements (LEEs, such as, e.g., light emitting diodes (LEDs)) configured to emit light and a redirecting optic. In some implementations, the redirection optic is also referred to as secondary optic.

Depending on the embodiment, the adjustable illumination device is configured to redirect the emitted light as output light in one or more direct angular ranges 262 and one or more indirect angular ranges 162, 162', for example, on one or more sides or in one or more corners of a ceiling of a room. In this manner, the adjustable illumination devices 100-1, 100-2, 100-3 are configured to provide direct illumination of the area (in accordance with the one or more direct angular ranges 262), and indirect illumination towards the ceiling 180 (as illustrated by the indirect angular distributions 162, 162'). While the target area in FIG. 1A is the floor 190, more generally, the target area can be a workspace, a desk, a floor, or other target area. Rays 152 and 152' encompass the direct angular range 262. For indirect angular ranges, such as angular ranges 162, 162', for example, the prevalent direction of the angular ranges are indicated by arrows.

In this example, a secondary optic 140 of each adjustable illumination device is positioned at a different distance from the ceiling 180: secondary optic 140 of the adjustable illumination device 100-1 is located at a distance H1 from the ceiling 180; secondary optic 140 of the adjustable illumination device 100-2 is located at a distance H2 from the ceiling 180 (H2>H1); and secondary optic 140 of the adjustable illumination device 100-3 is located at a distance H3 from the ceiling 180 (H3>H2.) In some embodiments, the distance of the secondary optics to the ceiling can be 5 cm or more, 10 cm or more, 15 cm or more, or 20 cm or more.

For each illumination device these distances are adjustable as described in detail below. The distance of the secondary optics from the ceiling 180 can affect the forward and/or backward illumination distribution of the adjustable illumination device. In particular, the size of the illuminated area of the floor 190 and the ceiling 180 depends on the relative position of the secondary optic 140 with respect to the ceiling 180. For example, the adjustable illumination device 100-1 with a fully retracted luminaire module provides the largest area of direct illumination and the smallest area of indirect illumination, whereas the adjustable illumination device 100-3 with a fully extended luminaire module provides the smallest area of direct illumination and the largest area of indirect illumination. In some embodiments, the secondary optic is fixed with respect to the LEEs, therefore, the secondary optic and LEEs together move relative to the ceiling.

In general, the illumination distribution provided by each adjustable illumination device varies depending on the optical design of the device and the distance of secondary optic 140 from ceiling 180. Accordingly, adjustable illumination devices 100-1, 100-2, and 100-3 can be configured to provide a particular light intensity distribution on a target area, subject to given constraints. For example, the adjustable illumination devices 100-1, 100-2, and 100-3 can be configured to substantially uniformly illuminate the floor 190 (e.g., to obtain approximately 10% overlap between each of the adjacent direct angular ranges at the floor level, thereby providing continuous illumination of the floor with little variation in intensity) or focus the direct illumination on respective target areas. The adjustable illumination devices can be configured to be in conformance with glare standards (e.g., light redirected towards the floor 190 in any of the direct angular range 262 does not exceed a glancing angle of 40° with respect to the z-axis.) The adjustable illumination devices 100-1, 100-2, and 100-3 can be configured to maintain glare standards desired of traditional illumination systems (not illustrated).

Such configurations of the adjustable illumination devices can be implemented by selecting appropriate combinations of system parameters including (i) direct angular range 262 of direct light output by the adjustable illumination devices 100-1, 100-2, and 100-3; (ii) indirect angular ranges 162, 162' of indirect light output by the adjustable illumination devices 100-1, 100-2, and 100-3; (iii) distance between nearest adjustable illumination devices 100-1, 100-2, and 100-3, e.g., about 6 ft or more, about 10 ft or more, about 15 ft or more, about 24 ft; and (iv) distance H from the ceiling 180 to an effective center of the adjustable illumination devices 100-1, 100-2, and 100-3.

As shorthand, the positive z-direction is referred to herein as the "forward" direction and the negative z-direction is the "backward" direction. Sections through the illumination devices parallel to the x-z plane are referred to as the "cross-section" or "cross-sectional plane" of the illumination device.

Figure 1B:
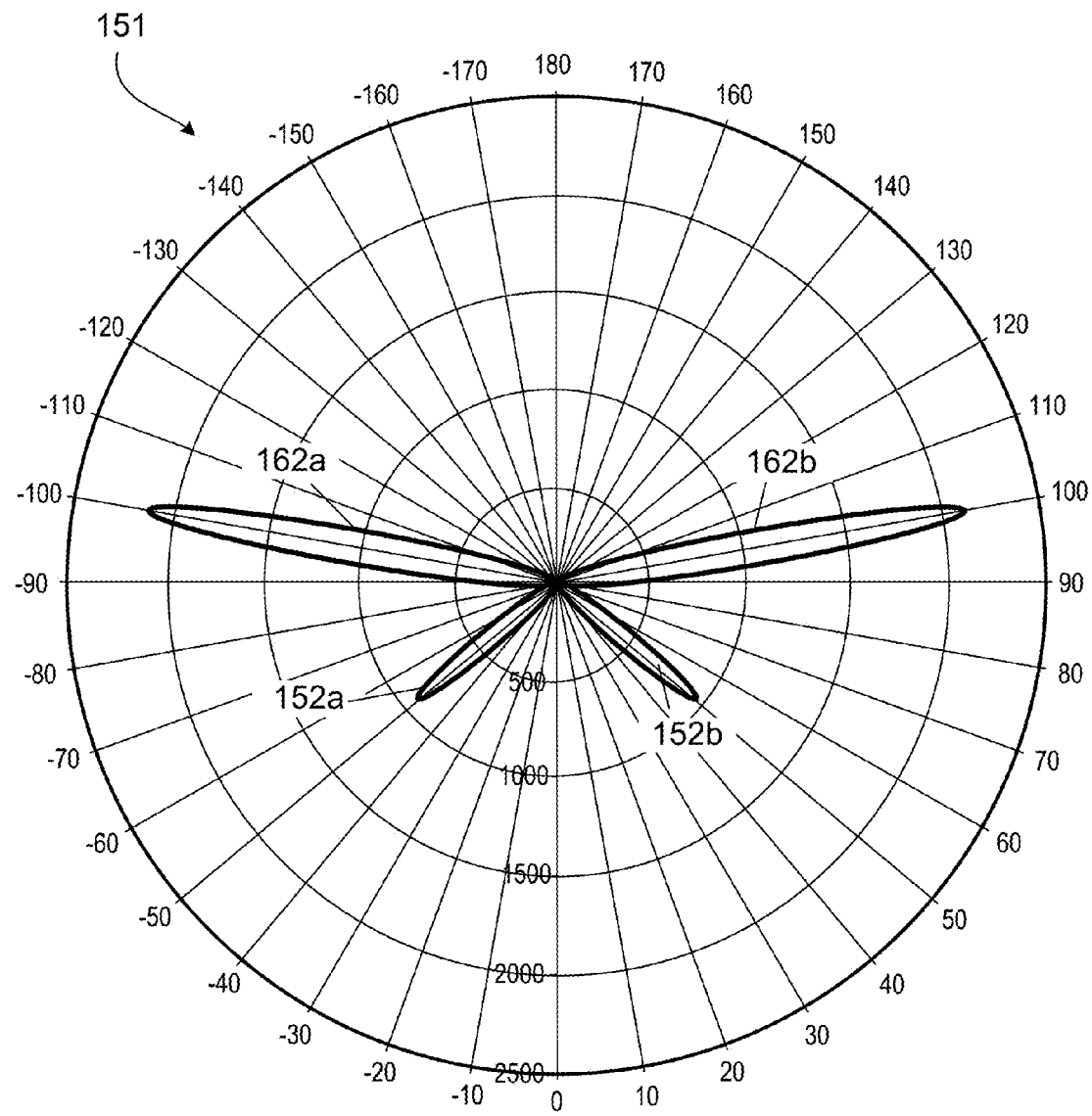
FIG. 1B is a polar plot of an example of an intensity profile of an adjustable illumination device.

FIG. 1B shows, for the x-z plane, an example light intensity profile 151 of an adjustable illumination device, such as adjustable illumination devices 100-1, 100-2, and 100-3. The intensity profile 151 includes four lobes 152a, 152b, 162a, and 162b. Depending on the embodiment, a distinction between lobes 152a and 152b may be notional as both may be superimposed, for example, and appear indistinguishable from each other. The result may be similar to what is described with respect to FIG. 1C. Here, the adjustable illumination device is configured to direct substantially all of the indirect (background) light 162a, 162b into a range of polar angles between +90° and −110°, and between +90° and +110° in a cross-sectional plane (x-z) of the adjustable illumination device. The adjustable illumination device is also configured to direct substantially all of the forward (e.g., direct) light into a pair of narrow lobes 152a, 152b having a range of polar angles having maximum intensity at −50° and +50° in the x-z cross-sectional plane, respectively. Lobes 152a, 152b of the light intensity profile 151 correspond to direct angular ranges and lobes 162a, 162b correspond to indirect angular ranges.

Figure 1C:
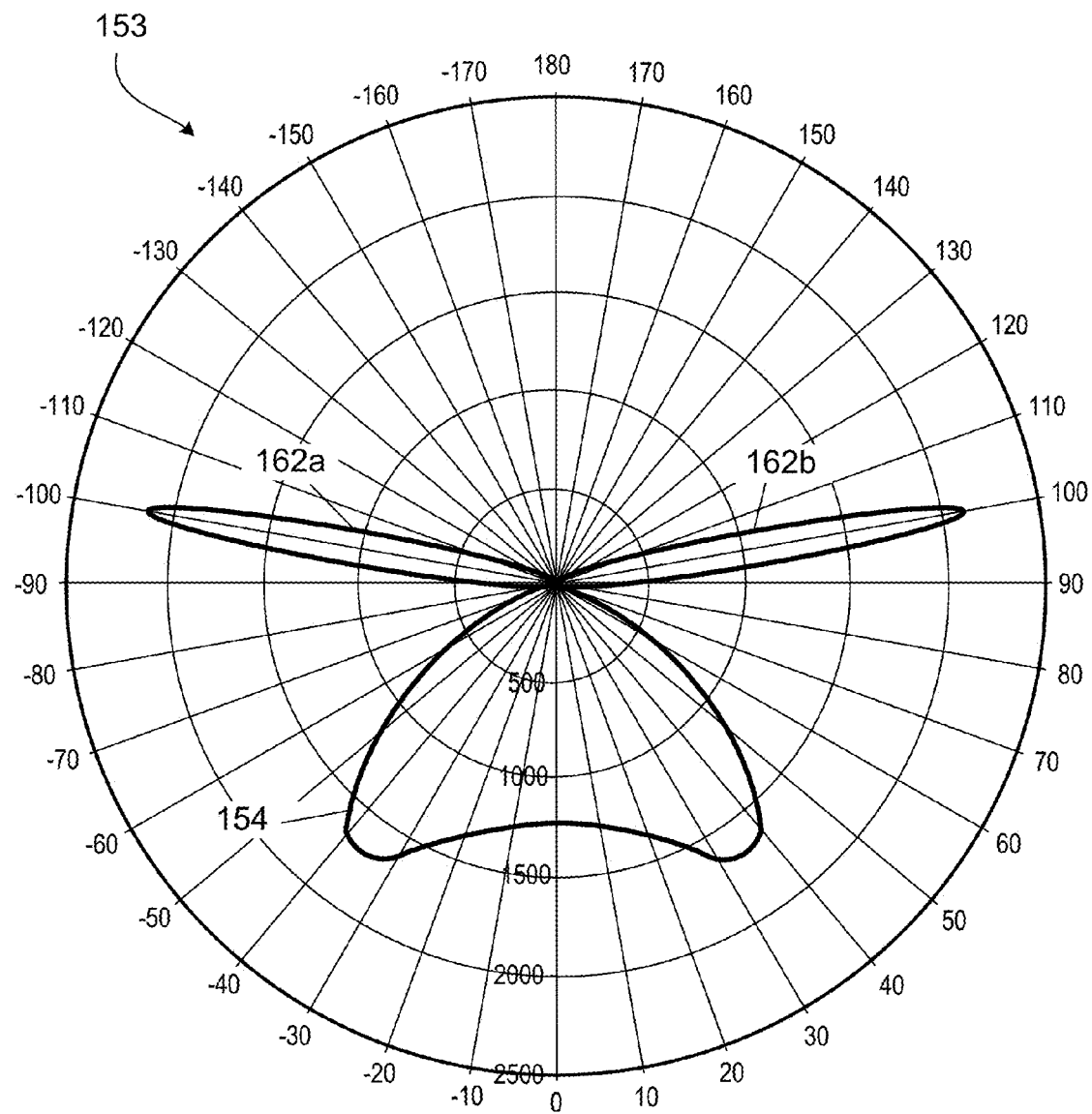
FIG. 1C is a polar plot of another exemplary intensity profile of an adjustable illumination device.

FIG. 1C shows another example light intensity profile 153 from an adjustable illumination device 100. Here, intensity profile 153 includes lobes 162a and 162b having maximal intensity at −100° and +100°, respectively. These lobes correspond to indirect illumination. Intensity profile 153 also includes a single lobe 154 in the forward direction, providing illumination in an angular range from about −60° to +60°.

In general, light emitting in the forward direction (e.g., lobes 152a, 152b, or lobe 154) may be within a range between about −50° and about +50° (e.g., from about −60° and about +60°, from about −70° and about)+70° in order to reduce glare from the adjustable illumination device.

As described in detail below, composition and geometry of components of the adjustable illumination device affect the light intensity profile and may be selected to provide direct and indirect illumination into ranges having varying angular width and direction.

Figure 2A:
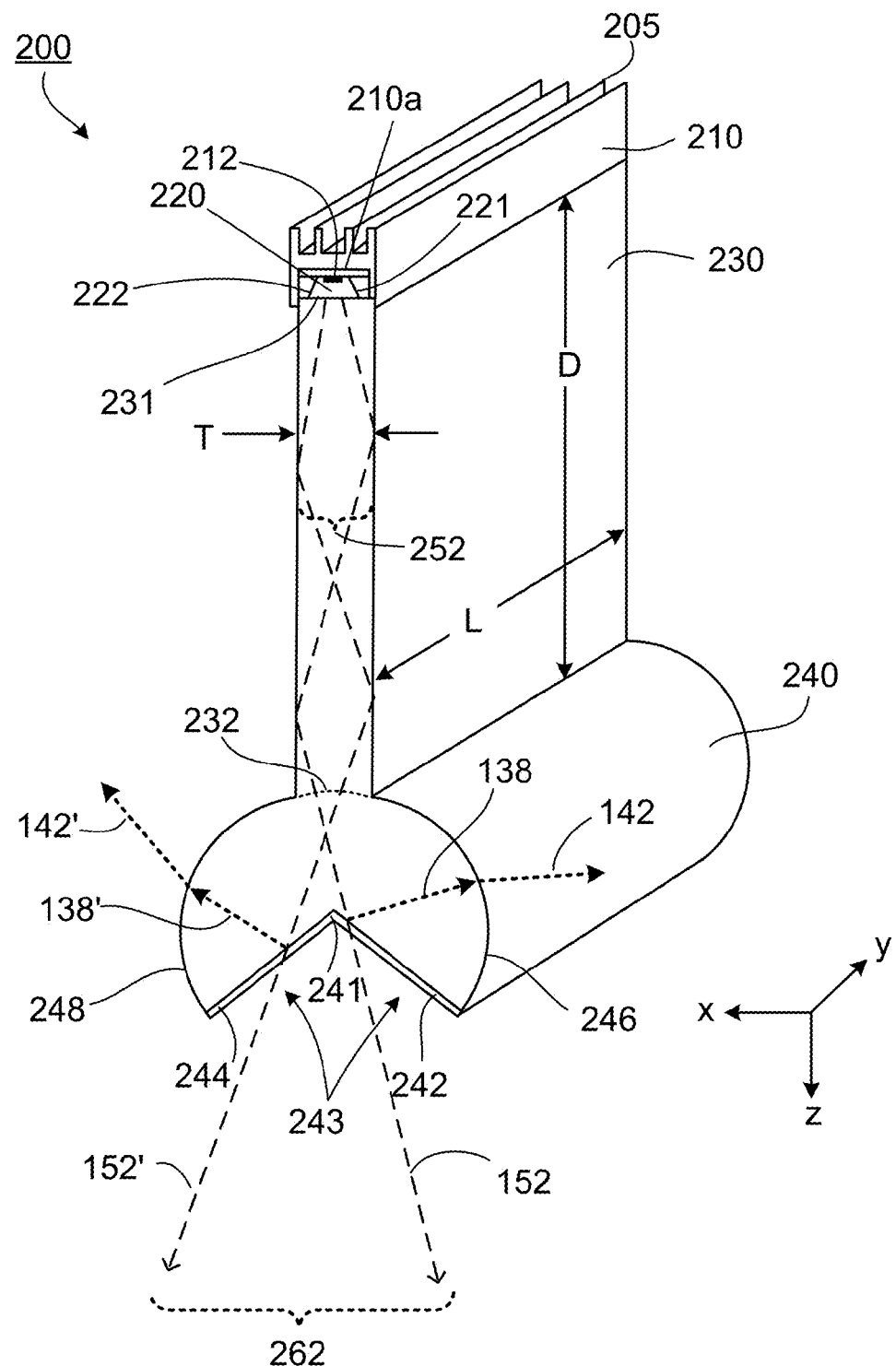
FIG. 2A is a perspective view of an example of a luminaire module.

FIG. 2A shows an example of a luminaire module 200. The luminaire module 200 includes a mount 210 having a plurality of LEEs 212 distributed along a first surface 210a of the mount 210. The luminaire module 200 includes primary optics 220 (e.g., optical couplers corresponding to the LEEs 212), a light guide 230, and secondary optics 240 (e.g., an optical extractor.) Light emitted by the LEEs 212 couples into the light guide 230 (either directly or upon reflection by surfaces 221 and 222 of primary optics 220) and is guided by the light guide 230 to secondary optics 240.

In secondary optics 240, the light is incident on surfaces 242 and 244, where part of the light is reflected in angular ranges 138, 138' and part of the light is transmitted in angular range 262. The reflected light exits the secondary optics 240 through surfaces 246, 248. The direct illumination of luminaire module 200 corresponds to light output in the angular range 262, and the indirect illumination corresponds to light output in angular ranges 142, 142'. In some embodiments, luminaire modules can be configured to output light in forward direction in an angular range qualitatively similar to angular range 154 of FIG. 1C, for example.

In this example, luminaire module 200 extends along the y-direction, so this direction is referred to as the "longitudinal" direction of the luminaire module. Lastly, implementations of luminaire modules can have a plane of symmetry parallel to the y-z plane. This is referred to as the "symmetry plane" of the luminaire module.

Mount 210, the light guide 230, and the secondary optic 240 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 212 on the mount 210 will generally depend, inter alia, on the length L, for example, more LEEs may be used for longer luminaire modules. In some implementations, a luminaire module may include as few as about 10 LEEs or as many as about 1,000 LEEs or more (e.g., about 50 LEEs, about 100 LEEs, about 200 LEEs, about 500 LEEs). Generally, the density of LEEs (e.g., number of LEEs per unit length) will also depend on the nominal power of the LEEs and luminance desired from the luminaire module. For example, a relatively high density of LEEs can be used in applications where high luminance is desired or where low power LEEs are used. In some implementations, the luminaire module 200 has an LEE density along its length of 0.1 LEE per centimeter or more (e.g., 0.2 per centimeter or more, 0.5 per centimeter or more, 1 per centimeter or more, 2 per centimeter or more). In some implementations, LEEs can be evenly spaced along the length, L, of the luminaire module. In some implementations, a heat-sink 205 can be attached to the mount 210 to extract heat emitted by the plurality of LEEs 212. The heat-sink 205 can be disposed on a surface of the mount 210 opposing the side of the mount 210 on which the LEEs 212 are disposed.

The primary optics 220 include one or more solid pieces of transparent optical material (e.g., a glass material or a transparent organic plastic, such as polycarbonate or acrylic) having surfaces 221 and 222 positioned to reflect light from the LEEs 212 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., with reflectivities exceeding 80% or 90% of the visible light spectrum such as a reflective metal, e.g. aluminum or silver), to provide a highly reflective optical interface. The cross-sectional profile of primary optics 220 can be uniform along the length L of luminaire module 200. Alternatively, the cross-sectional profile can vary. For example, surfaces 221 and/or 222 can be curved out of the x-z plane.

The surface of the primary optics 220 adjacent to an upper edge 231 of the light guide 230 is optically coupled to the edge 231. In some embodiments, the surfaces of the interface are attached using a material that substantially matches the refractive index of the material forming the primary optics 220 or light guide 230 or both. For example, the primary optics 220 can be affixed to the light guide 230 using an index matching fluid, grease, or adhesive. In some implementations, the primary optics 220 are fused to the light guide 230 or they are integrally formed from a single piece of material (e.g., coupler and light guide may be monolithic and may be made of a solid transparent optical material).

In general, primary optics 220 are designed to restrict the angular range of light entering the light guide 230 (e.g., to within +/−40 degrees) so that at least a substantial amount of the light is coupled into spatial modes in the light guide 230 that undergoes TIR at the side surfaces of the light guide. The example light guide 230 has a uniform thickness T, which is the distance separating two planar opposing surfaces of the light guide. Generally, T is sufficiently large so the light guide has an aperture at an upper edge 231 sufficiently large to approximately match (or exceed) the aperture of primary optics 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

The light guide 230 can be formed from a piece of transparent material (e.g., glass material such as BK7, fused silica or quartz glass, or a transparent organic plastic, such as polycarbonate or acrylic) that can be the same or different from the material forming the primary optics 220. The example light guide 230 extends length L in the y-direction, has a uniform thickness T in the x-direction, and a uniform depth D in the z-direction. The dimensions D and T are generally selected based on the desired optical properties of the light guide and/or the direct/indirect intensity distribution. During operation, light coupled into the light guide 230 from the primary optics 220 (depicted by angular range 252) reflects off the planar surfaces of the light guide by total internal reflection and spatially mixes within the light guide. The mixing can help achieve illuminance and/or color uniformity at the output end 232 of the light guide 230 at the secondary optic 240. The depth, D, of the light guide 230 can be selected to achieve adequate uniformity at the exit aperture (i.e., at output end 232) of the light guide. In some implementations, D is in a range from about 1 cm to about 20 cm (e.g., 2 cm or more, 4 cm or more, 6 cm or more, 8 cm or more, 10 cm or more, 12 cm or more).

While in this example, the primary optics 220 and the light guide 230 are formed from solid pieces of transparent optical material, hollow structures are also possible. For example, the primary optics 220 or the light guide 230 or both may be hollow with reflective inner surfaces rather than being solid. As such material cost can be reduced and absorption in the light guide avoided. A number of specular reflective materials may be suitable for this purpose including materials such as 3M Vikuiti™ or Miro IV™ sheet from Alanod Corporation where greater than 90% of the incident light would be efficiently guided to the secondary optic.

The surface of secondary optics 240 adjacent to the output end 232 of light guide 230 is optically coupled to the output end 232. For example, secondary optics 240 can be affixed to light guide 230 using an index matching fluid, grease, or adhesive. In some implementations, secondary optics 240 are fused to light guide 230 or they are integrally formed from a single piece of material.

The secondary optics 240 is also composed of a solid piece of transparent optical material (e.g., a glass material or a transparent organic plastic, such as polycarbonate or acrylic) that can be the same as or different from the material forming the light guide 230. In the example implementation shown in FIG. 2A, the piece of dielectric material includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the luminaire module 200.

Surfaces 242 and 244 are coated with a highly reflective material (e.g., with reflectivities exceeding 80% or 90% of the visible light spectrum, e.g. a highly reflective metal, such as aluminum or silver) over which a protective coating may be disposed. Thus, surfaces 242 and 244 provide a highly reflective optical interface for light entering an input end of the secondary optics from light guide 230. The surfaces 242 and 244 include portions that are transparent to the light entering at the input end of the secondary optics. For example, these portions can be uncoated regions or discontinuities (e.g., slots, slits, apertures) of the surfaces 242 and 244. The transmitted light exits the secondary optics 240 through surfaces 242 and 244 in angular range 262. The transmitted light also may also be refracted.

In the x-z cross-sectional plane, the lines corresponding to surfaces 242 and 244 have the same length and form an apex or vertex 241, e.g., a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more).

In the example implementation shown in FIG. 2A, the output surfaces 246 and 248 of the secondary optic 240 are curved with a constant radius of curvature that is the same for both. Accordingly, luminaire module 200 has a plane of symmetry intersecting apex 241 parallel to the y-z plane. Because surfaces 246 and 248 are curved, they may serve to focus light (e.g., reduce the amount of divergence of the light) reflected by redirecting surfaces 242 and 244.

In general, the geometry of the secondary optics 240 plays a role in shaping the lobes of light emitted by the adjustable illumination device. For example, the smaller the angle at apex 241, the lower the angle of incidence the reflected light will have and the smaller the angle of its deflection. Accordingly, the vertex angle can be used to provide the desired direction of the lobes of indirect light emitted by the adjustable illumination device. The emission spectrum of the luminaire module 200 corresponds to the emission spectrum of the LEEs 212. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in the luminaire module 200. For example, a wavelength-conversion material may be disposed proximate the LEEs 212, adjacent surfaces 242 and 244 of the secondary optic 240, on the exit surfaces 246 and 248 of the secondary optic 240, placed at a distance from the exit surfaces 246 and 248, and/or at other locations.

In some embodiments, a layer of wavelength-conversion material may be attached to light guide 230 held in place via a suitable support structure (not illustrated), disposed within the secondary optics (also not illustrated) or otherwise arranged, for example. Wavelength-conversion material that is disposed within the secondary optics may be configured as a shell or other object and disposed within a notional area that is circumscribed by R/n or even smaller $R*(1+n^2)^{(-1/2)}$, where R is the radius of curvature of the light-exit surfaces (246 and 248 in FIG. 2A) of the secondary optics and n is the index of refraction of the portion of the secondary optics that is opposite of the wavelength-conversion material as viewed from the reflective surfaces (242 and 244 in FIG. 2A). The support structure may be a transparent self-supporting structure. The light converting material diffuses light as it converts the wavelengths, provides mixing of the light and can help uniformly illuminate tertiary reflectors (not shown in FIG. 2A).

As noted previously, the geometry of secondary optics 240 plays an important role in shaping the light emitted by the adjustable illumination device. For instance, the shape of surfaces 242 and 244 may vary in accordance with the desired emission. While surfaces 242 and 244 are depicted as planar surfaces, other shapes are also possible. For example, these surfaces can be curved or faceted. Curved redirecting surfaces 242 and 244 can be used to narrow or widen the beam. Depending of the divergence of the angular range of the light that is received at the input end of the secondary optics, concave reflective surfaces 242, 244 can narrow the light intensity distribution output by the secondary optics 240, while convex reflective surfaces 242, 244 can widen the light intensity distribution output by the secondary optics 240. As such, suitably configured redirecting surfaces 242, 244 may introduce convergence or divergence into the light. Such surfaces can have a constant radius of curvature, can be parabolic, hyperbolic, or have some other curvature.

Figure 2B:
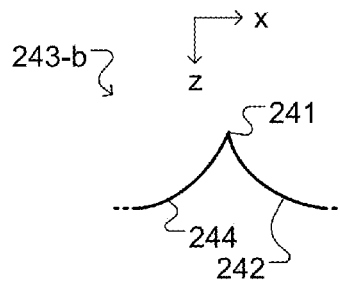
FIGS. 2B-2G are schematic diagrams showing embodiments of an aspect of the luminaire module shown in FIG. 2A.
Figure 2C:
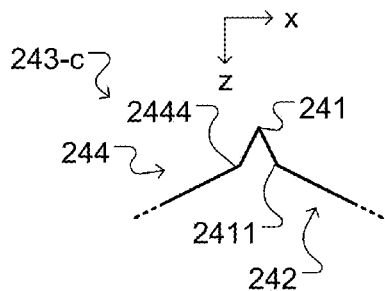
Figure 2D:
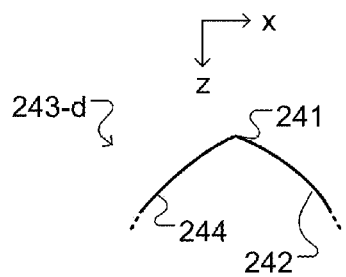

FIGS. 2B and 2D show redirecting surfaces 243-*b* and 243-*d* having an apex 241 that separates the curved redirecting surface 242, 244. It should be noted that the apex 241 of the redirecting surface can be a rounded vertex with a non-zero radius of curvature. Here, the redirecting surface 242, 244 have arcuate shapes in the cross-sectional plane substantially perpendicular to the longitudinal dimension of the luminaire module 200. For example, the first and second portions of the redirecting surface 242, 244 can be parabolic, hyperbolic, and/or can have constant curvatures different from each other. Moreover, curvatures of the first and second portions of the redirecting surface 242, 244 can be both negative (e.g., convex with respect to a direction of propagation of light from the input end of the secondary optics to the redirecting surface), can be both positive (e.g., concave with respect to the propagation direction), or one can be positive (convex) and the other one can be negative (concave).

Figure 2E:
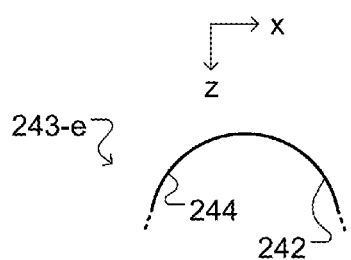

FIG. 2E shows a redirecting surface 243-*e* shaped as an arc of a circle, ellipse, parabola or other curve. In this case, the first and second portions of the redirecting surface 242, 244 represent first and second portions of the arc of the circle. The curvature of the redirecting surface 243 is negative (e.g., convex with respect to a direction of propagation of light from the input end of the secondary optics to the redirecting surface 243).

FIG. 2C shows a redirecting surface 243-*c* that includes faceted surfaces 242, 244. Here, the surfaces meet at apex 241. Additionally, the facets forming surface 242 meet at an apex 2444 while the facets forming surface 242 meet at an apex 2411. The facets of each surface can have linear or arcuate shapes. Moreover, the facets may be arranged to reflect the light received from the input end of the secondary optics in different angular sub-ranges. In this manner, light provided by the different facets of each of the surfaces 242 and 244 is output at the output surfaces 246 and 248, respectively, as two intensity lobes that can be manipulated differently, e.g., to illuminate different targets.

Figure 2F:
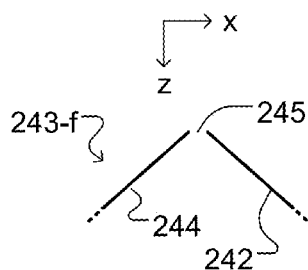

FIG. 2F shows a redirecting surface 243-*f* where the redirecting surfaces 242 and 244 are separated by a slot 245, in general a suitably formed aperture. Slot 245 corresponds to a gap in the reflective material at the surface and allows for light to be transmitted in a forward direction out of the secondary optics. In general, the width of the slot 245 may vary as desired, in accordance with the desired proportion of light to be transmitted by the secondary optics.

Figure 2G:
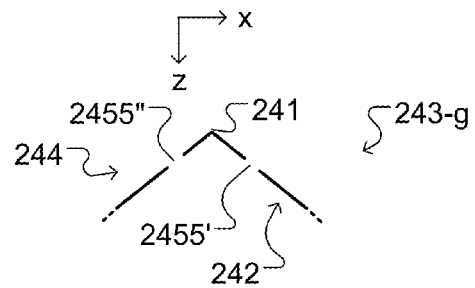

FIG. 2G shows a redirecting surface 243-*g* in which surface 242 includes a slot 2455' and surface 244 includes a slot 2455". Such slots may represent an opening in a coating providing a reflecting layer of the redirecting surface 243-*g* and allows transmission of at least some (e.g., about 1%, 5%, 10%, 20% or more) of the light received from the light guide.

For redirecting surfaces 243-*f* and 243-*g*, each slot may extend along the entire longitudinal extension of the luminaire module 200. Alternatively, redirecting surfaces may include multiple slots each extending a fraction of the length of the module. Moreover, while embodiments showing a single slot and two slots (in a cross-section) are illustrated, it will be appreciated that any number of slots may be included depending on the desired transmission properties of the secondary optics. Furthermore, embodiments may feature additional optical elements located at the slots to shape the transmitted light. For example, secondary optics may include focusing or defocusing elements, diffusing elements, and/or diffractive elements that provide additional light shaping to the light transmitted by the slots.

In addition, the curves corresponding to each of the cross-sectional planes illustrated in FIGS. 2B-2G can have different shapes and different discontinuities in other cross-sectional planes along the longitudinal dimension of the luminaire module 200. In general, different cross-sections of a redirecting surface 243 can have different combinations of disjoint or joined piecewise differentiable curves.

In the examples illustrated in FIGS. 2F-2G, the luminaire module 200 can be used in an adjustable illumination device, where direct illumination corresponds to light output through the transparent portions of the redirecting surface 243-*f* or 243-*g*, and indirect illumination corresponds to light output through surfaces 246/248 of the luminaire module 200, as described below in connection with FIGS. 3-4, for example.

Figure 3:
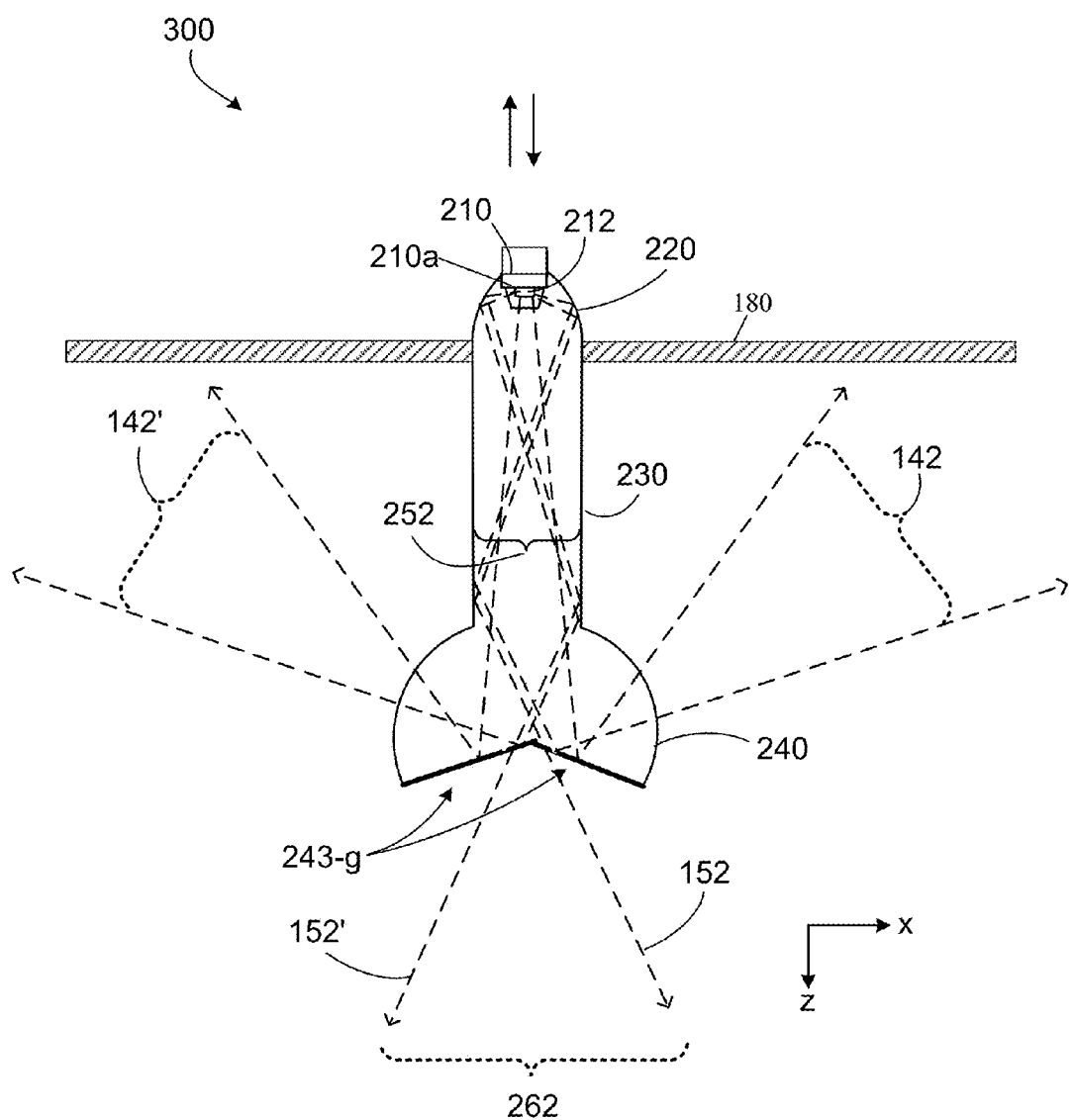
FIG. 3 is a cross-sectional view of an example of an adjustable illumination device with a solid luminaire module.
Figure 4:
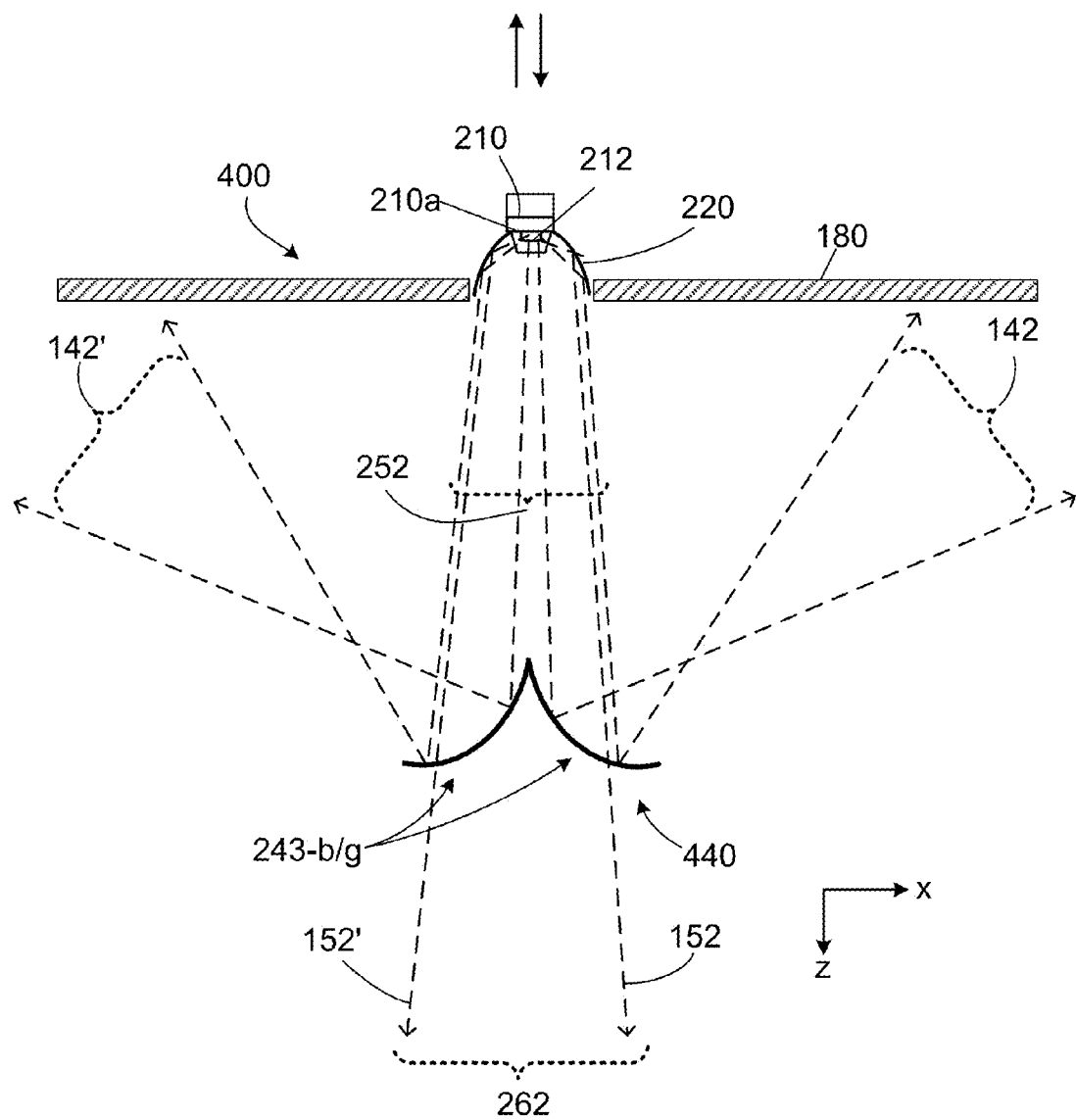
FIG. 4 is a cross-sectional view of an example of an adjustable illumination device with a hollow luminaire module.

In some embodiments, it is also possible to use redirecting surfaces that do not include slots in the reflective layer to provide both direct and indirect light as shown in FIGS. 3-4. For example, rather than providing a highly-reflective layer on the redirecting surface, a partially-reflecting layer may instead be used (e.g., a partially-silvered surface). In this way, the redirecting surface (e.g., as illustrated in FIGS. 2B-2E) acts as a beam splitter rather than a mirror, and transmits a desired portion of incident light, while reflecting the remaining light. In certain embodiments, additional optical layers may be included adjacent the partially-reflecting layer that can further shape the transmitted light. For example, a diffusing layer may be included. Alternatively, or additionally, a lens or lens array may be included (e.g., such as a micro-structured film composed of lenticular lenses or prisms).

In the examples illustrated in FIGS. 2B-2E, where a highly reflective material is included at the redirecting surface, light is output from the secondary optics 240 of the luminaire module 200 only through surfaces 246/248. In this case, luminaire module 200 can be used as a component of the adjustable illumination device 100, where the output light is further redirected by tertiary reflectors (not shown) to provide direct illumination.

Moreover, the shape of the output surfaces 246 and 248 of the secondary optic 240 can vary as well, and thus, the surfaces 246 and 248 can steer and shape the beam of light. For example, the radius of curvature of these surfaces can be selected so that the surfaces introduce a desired amount of convergence into the light. Aspheric surfaces can also be used. Similar properties noted above in connection with FIGS. 2B-2G regarding contours of the redirecting surface of the secondary optic 240 in cross-sectional planes substantially perpendicular to the longitudinal dimension of the luminaire module 200 apply to contours of the output surfaces 246, 248 of the secondary optics 240 in such cross-sectional planes.

In general, choices of redirecting surfaces described in FIGS. 2B-2G can provide an additional degree of freedom for modifying the (direct or indirect or both) intensity distribution (e.g., illumination pattern) of the light output by the adjustable illumination devices. In general, the luminaire modules 200, direct secondary reflectors, indirect optics, the arrangement of indirect and direct LEEs with respect to a mount of an adjustable illumination device, and the first and second apexes may be iteratively modified in their spatial position and/or optical properties (spatial shape of reflective surfaces, index of refraction of solid material, spectrum of emitted or guided light, etc.) to provide a predetermined direct and/or indirect illumination distribution.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, the luminaire modules can include other features useful for tailoring the intensity profile. For example, in some implementations, luminaire modules can include an optically diffusing material and/or structure that scatters light, which can be configured to homogenize the luminaire module's intensity profile to predetermined degrees. For example, surfaces 242 and 244 can have an engineered roughness or interface structure or include a diffusely reflecting material, rather than a specular reflective material, and/or a coat can be applied to these surfaces. Accordingly, the optical interfaces at surfaces 242 and 244 can diffusely reflect light, and/or scatter light into broader lobes that would be provided by similar structures utilizing specular reflection at these interfaces. In some implementations, these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

In certain implementations, a light scattering material can be disposed on surfaces 246 and 248 of secondary optics 240 (e.g., surfaces 246 and 248 can have an engineered roughness or include a layer of a diffusely transmitting material). Alternatively, or additionally, surfaces 246 and 248 need not be surfaces having a constant radius of curvature. For example, surfaces 246 and 248 can include portions having differing curvature and/or can have structure thereon (e.g., structural features that scatter or diffract light).

FIG. 3 schematically shows an adjustable illumination device 300 mounted to a ceiling 180. In this example, the adjustable illumination device 300 includes a solid embodiment of the luminaire module 200 described above in connection with FIG. 2A and the position of the luminaire module 200 can be adjusted relative to the ceiling 180. In some implementations, the adjustable illumination device 300 is elongated along the y-axis (perpendicular to the page.) The adjustable illumination device 300 includes a mount 210, multiple LEEs 212, primary optics 220, a light guide 230 and a solid secondary optic 240.

In this example, the mount 210 has a first surface 210a with a normal parallel to the z-axis. The multiple LEEs 212 are disposed on the first surface 210a of the mount, such that the LEEs 212 emit, during operation, light in a first angular range with respect to the normal to the first surface 210a of the mount 210.

The primary optics 220 are arranged on the first surface 210a and coupled with the LEEs 212. The primary optics 220 are shaped to redirect light received from the LEEs 212 in a first angular range, and to provide the redirected light in a second angular range 252. A divergence of the second angular range 252 is smaller than a divergence of the first angular range at least in the x-z plane. The light guide 230 includes input and output ends. In this case, the input and output ends of the light guide 230 have substantially the same shape. The input end of the light guide 230 is coupled to the primary optics 220 to receive the light provided by the primary optics 220 in the second angular range 252. Further, in this example, the light guide 230 is shaped to guide the light received from the primary optics 220 in the second angular range 252 and to provide the guided light at the output end of the light guide 230.

The secondary optic 240 includes an input end, a redirecting surface 243-$g$ opposing the input end and first and second output surfaces. The input end of the solid secondary optic 240 is coupled to the output end of the light guide 230 to receive the light provided by the light guide 230. In this case, the redirecting surface 243-$g$ has been described above in connection with FIG. 2G. The redirecting surface 243-$g$ has first and second portions that reflect the light received at the input end of the secondary optic 240 and provide the reflected light in third and fourth angular ranges with respect to the normal to the first surface 210a of the mount 210 towards the first and second output surfaces, respectively. At least prevalent directions of propagation of light in the third and fourth angular ranges are different from each other and from a prevalent direction of propagation of light in the second angular range 252 at least perpendicular to the y-axis.

Additionally, some regions of the first and second portions of the redirecting surface 243-$g$ are transparent (e.g., are uncoated with a reflecting layer, or have slots, apertures, etc.), such that the first and second portions of the redirecting surface 243-$g$ transmit (and sometime refract) the light received at the input end of the solid secondary optic 240 and output the transmitted ("leaked") and refracted light in fifth angular range 262 with respect to the normal to the first surface 210a of the mount 210, outside the first and second portions of the redirecting surface 243-$g$. Note that when transmission ("leakage") of light in fifth angular range 262 occurs through apertures of planar first and second portions of the redirected surface 243-$f$ or 243-$g$, the angular range 262 may correspond to the second angular range 252 of the light output at the output end of the light guide 230.

The first output surface is shaped to refract the light provided by the first portion of the redirecting surface 243-$g$ in the third angular range as first refracted light, and to output the first refracted light in a seventh angular range 142 with respect to the normal to the first surface 210a of the mount 210 outside the first output surface of the solid secondary optic 240. The second output surface is shaped to refract the light provided by the second portion of the redirecting surface 243-$g$ in the fourth angular range as second refracted light, and to output the second refracted light in an eighth angular range 142' with respect to the normal of the first surface 210a of the mount 210 outside the second output surface of the solid secondary optic 240. Moreover, prevalent directions of propagation of light in the seventh 142 and eighth 142' angular ranges are different from each other and have a non-zero component antiparallel with the normal to the first surface 210a of the mount 210.

In this manner, in some implementations, the adjustable illumination device 300 can provide direct illumination (in angular range 262) on a target space located in the positive direction of the z-axis (e.g., on the floor 190 or a desk) and indirect illumination (in angular ranges 142, 142') towards the ceiling 180.

While the foregoing example includes a light guide, other implementations are also possible. FIG. 4 shows another example of an adjustable illumination device 400. In this example, the adjustable illumination device 400 includes a hollow embodiment (i.e., embodiments that do not include a light guide and/or solid secondary optics) of a luminaire module described above in connection with FIG. 2A. A position of the luminaire module can be adjusted relative to the ceiling 180. The adjustable illumination device 400 includes a housing (not shown in FIG. 4) to which the luminaire module can be coupled. In some implementations, the housing can be a recess ceiling mount and the position of the luminaire module can be adjusted relative to the housing. In some implementations, the adjustable illumination device 400 is elongated along the y-axis (perpendicular to the page.) The adjustable illumination device 400 includes a mount 210, multiple LEEs 212, primary optics 220, and a secondary optic 440.

In this example, the mount 210 has a first surface 210a with a normal parallel to the z-axis. The multiple LEEs 212 are disposed on the first surface 210a of the mount, such that the LEEs 212 emit, during operation, light in a first angular range with respect to the normal to the first surface 210a of the mount 210.

The primary optics 220 are arranged on the first surface 210a and coupled with the LEEs 212. The primary optics 220 are shaped to redirect light received from the LEEs 212 in the first angular range, and to provide the redirected light in a second angular range 252. A divergence of the second angular range 252 is smaller than a divergence of the first angular range at least in the x-z plane.

The secondary optic 440 includes a redirecting surface 243-b/g. In this case, the redirecting surface 243-b/g has first and second portions that are shaped as described above in connection with FIG. 2B. In addition, some regions of the first and second portions of the redirecting surface 243-b/g are transparent (e.g., are uncoated with a reflecting layer, or have slots, apertures, etc.) The first and second portions of the redirecting surface 243-b/g reflect the light received from the primary optics 220 in the second angular range 252, and provide the reflected light in third 142 and fourth 142' angular ranges with respect to the normal to the first surface 210a of the mount 210, respectively. At least prevalent directions of propagation of light in the third 142 and fourth 142' angular ranges are different from each other and from a prevalent direction of propagation of light in the second angular range 252 at least perpendicular to the y-axis. Moreover, prevalent directions of propagation of light in the third 142 and fourth 142' angular ranges are different from each other and have a non-zero component antiparallel with the normal to the first surface 210a of the mount 210.

Additionally, the transparent regions of the first and second portions of the redirecting surface 243-b/g transmit the light received from the primary optics 220 in the second angular range 252, and output the transmitted ("leaked") light in fifth angular range 262 with respect to the normal to the first surface 210a of the mount 210. Note that in this case, the fifth angular range 262 may correspond to the second angular range 252 of the light received from the primary optics 220. Note that when transmission ("leakage") of light in fifth angular range 262 occurs without refraction (e.g., through apertures of the redirected surface 243-b/g), the fifth angular range 262 corresponds to the second angular range 252 of the light received at the secondary optic 440.

In this manner, in some implementations, the adjustable illumination device 400 provides direct illumination (in angular range 262) on a target space located in the positive direction of the z-axis (e.g., on the floor 190 or a desk) and indirect illumination (in angular ranges 142, 142') towards the ceiling 180. In other implementations, when secondary optic 440 includes partially light-transmissive (e.g., about 1%, 5%, 10%, 20% or more light transmission), redirecting surfaces, such as 243f/g shown in FIGS. 2F and 2G, the adjustable illumination device 400 provides direct illumination on the target space located in the positive direction of the z-axis (e.g., on the floor 190) in angular range 262 and indirect illumination towards the ceiling 180 in angular ranges 142, 142'.

Figure 5:
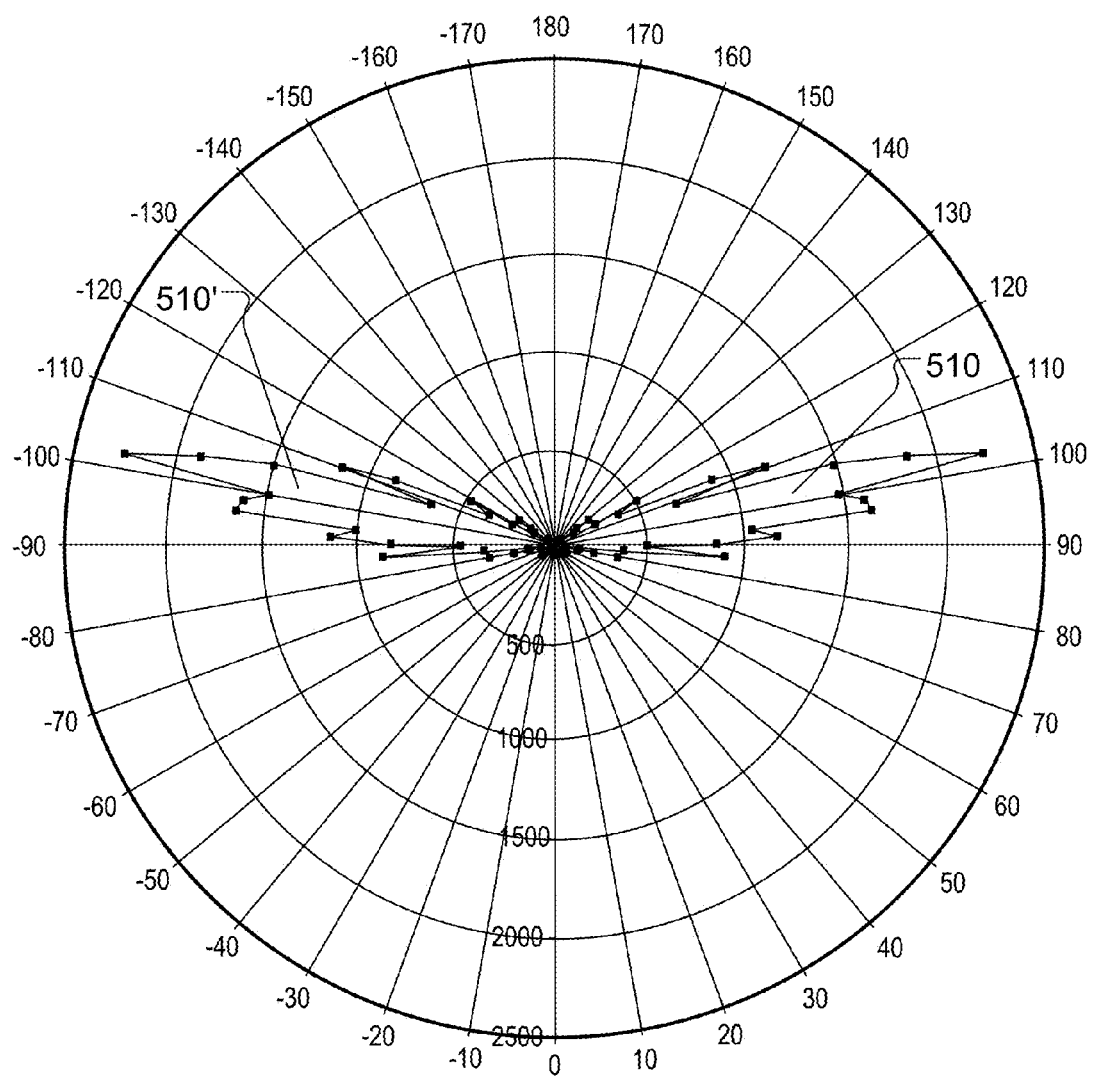
FIG. 5 is a polar plot of another exemplary intensity profile corresponding to an adjustable illumination device.

As explained herein, composition and geometry of components of the luminaire module can affect the intensity distribution provided by the luminaire module. For example, referring to FIG. 5, in some embodiments, luminaire modules can be configured to direct substantially all of the light into a range of angles between 90° to 120° and −90° to −120° in a cross-sectional plane of the luminaire module, where 0° corresponds to the direction of direct illumination and 180° corresponds to the direction of indirect illumination. The direction of direct illumination corresponds to a normal to the mount 210 and parallel to the light guide 230, and can be toward the target space (e.g., the floor 190) for an illumination device mounted on a ceiling. In FIG. 5, the intensity profile in the cross-sectional plane is given by traces 510 and 510', which correspond to the angular ranges 142 and 142' respectively. The intensity profile in the cross-sectional plane has maximum luminance at about 95° to 110°, and −95° to −110° respectively. Luminaire modules can be configured to direct little or no illumination into certain angular ranges, for example, to avoid glare. In this example, the luminaire module outputs almost no direct illumination toward the target space in ranges from 120° to 180° and −120° to −180°.

Figure 6A:
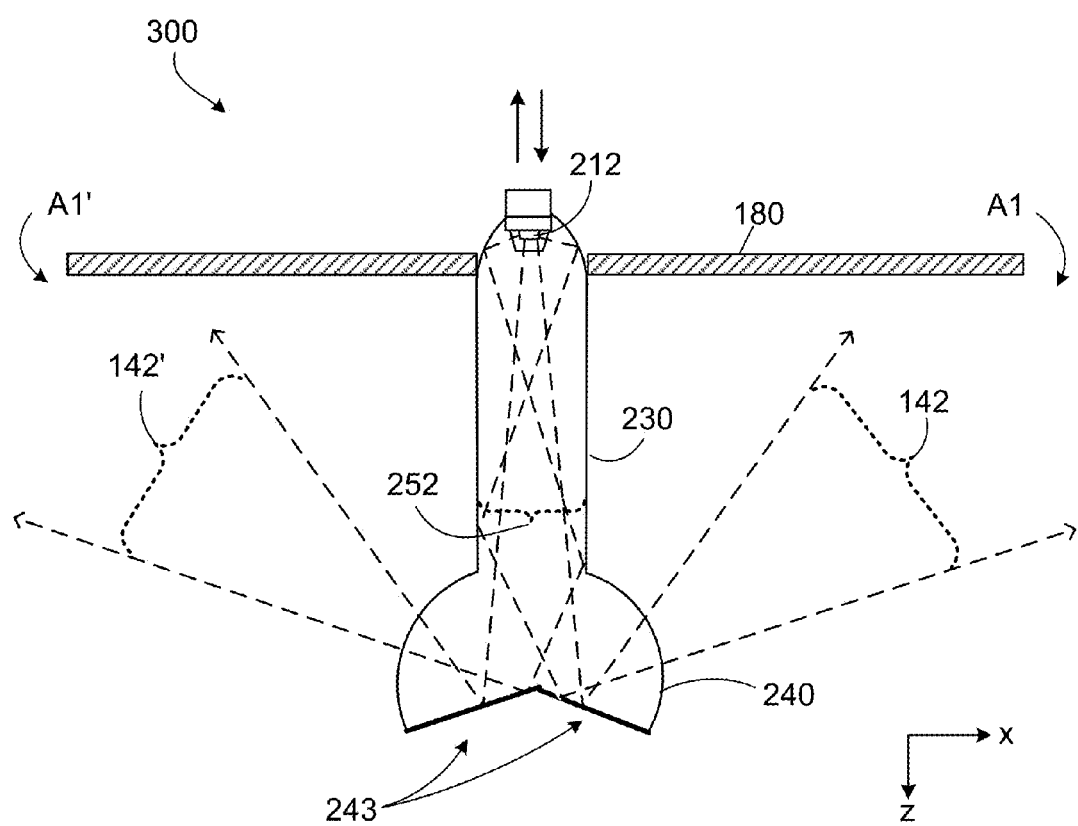

As described above, the degree of extension of the luminaire module of the adjustable illumination device affects the illumination pattern. FIG. 6A is an example of an adjustable illumination device 300 with a fully extended luminaire module (i.e., the secondary optic 240 is at maximum distance to the ceiling 180.) Light emitted by the LEEs 212 is guided through the light guide 230 to the secondary optic 240 and redirected by the redirecting surface 243 towards the output surfaces of the secondary optic 240. The redirected light is output through the output surfaces of the secondary optic 240 in angular ranges 142, 142' towards the ceiling 180 (e.g., ceiling). In this example, the adjustable illumination device 300 illuminates areas A1, A1' of the ceiling 180. Areas A1, A1' are the largest areas the adjustable illumination device 300 can illuminate since the secondary optic 240 is positioned at a maximum distance to the ceiling 180. Results of an optical simulation of the example illumination device 300 with Lighttools™ are shown in FIG. 6A. The length L (see FIG. 2A) of the light guide is about 600 mm and the depth D (see FIG. 2A) of the light guide is about 100 mm. The simulation is for a full extension of the example illumination device 300 to about 100 mm below the ceiling. The angular ranges 142, 142' have prevalent directions oriented along +100 degrees, −100 degrees respectively, and divergencies of about 20 degrees, as shown, for example, in FIG. 5.

FIG. 6B is a contour plot of a simulated intensity distribution on the ceiling 180 that corresponds to the configuration of the adjustable illumination device 300 shown in FIG. 6A (i.e., full extension of the luminaire module) and the intensity profile shown in FIG. 5. The y-axis of the plot shown in FIG. 6B refers to the illumination distribution in the longitudinal direction of the adjustable illumination device 300 (y-axis in FIG. 2A) and the x-axis of the plot refers to the illumination distribution in the transverse direction of the adjustable illumination device 300 (x-axis in FIG. 2A.)

FIG. 6C is a cross section plot of the intensity distribution from FIG. 6B in the transverse direction (x-axis) of the adjustable illumination device 300 at y=0. The second axis of the plot shown in FIG. 6C refers to illuminance (lux) in the transverse direction of the adjustable illumination device 300. In this example, the illuminance between a distance of −1,000 and +1,000 mm from the adjustable illumination device in transverse direction reaches up to 3,500 lux.

FIG. 6D is a cross section plot of the intensity distribution from FIG. 6B in the longitudinal direction (y-axis) of the adjustable illumination device 300 at x=0. The second axis of the plot shown in FIG. 6D refers to illuminance (lux) in the longitudinal direction of the adjustable illumination device 300. In this example, the illuminance between a distance of −400 and +400 mm from the adjustable illumination device along the longitudinal direction reaches up to 2,250 lux.

Figure 7A:
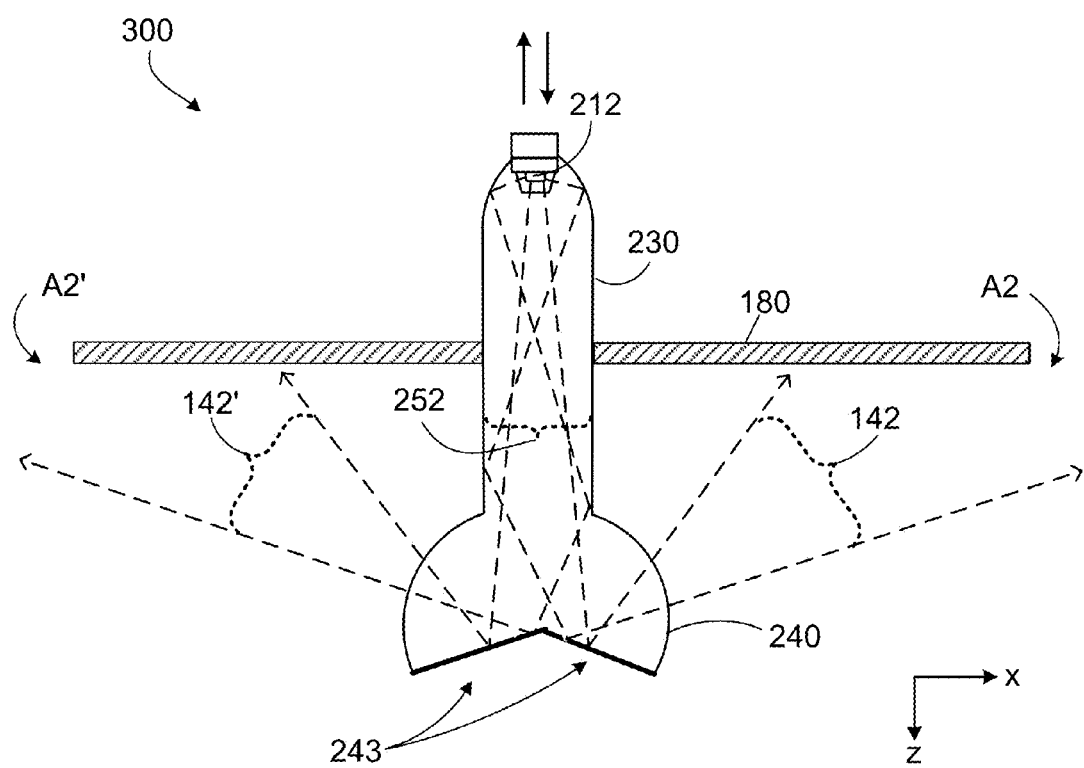
FIGS. 7A-7D show an example of an adjustable illumination with a partially extended luminaire module and corresponding illumination profiles.

FIG. 7A is an example of the adjustable illumination device 300 with a partially extended luminaire module. The secondary optic 240 is at a distance of about 75 mm to the ceiling 180. In this example, the adjustable illumination device 300 illuminates areas A2, A2' of the ceiling 180 that are smaller than the areas A1, A1'. In this simulation of FIG. 7A, the intermediate distance between the secondary optic and the ceiling represents approximately 75% of the depth of the luminaire module.

Figure 7C:
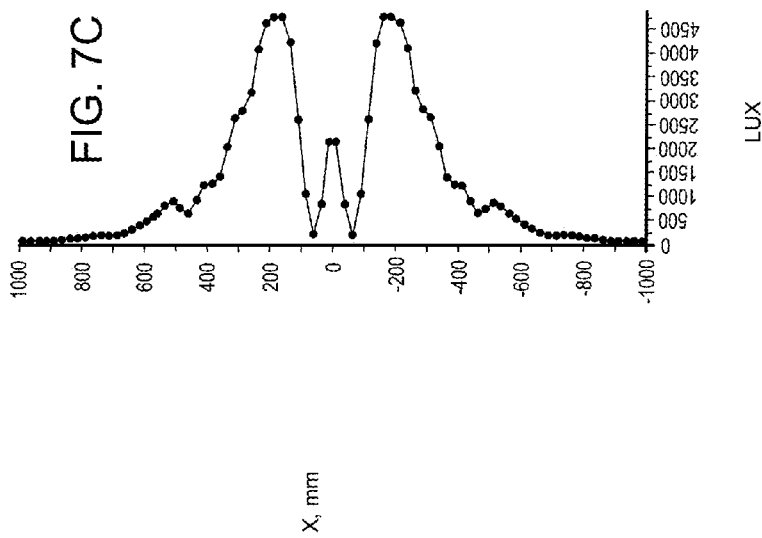
Figure 7B:
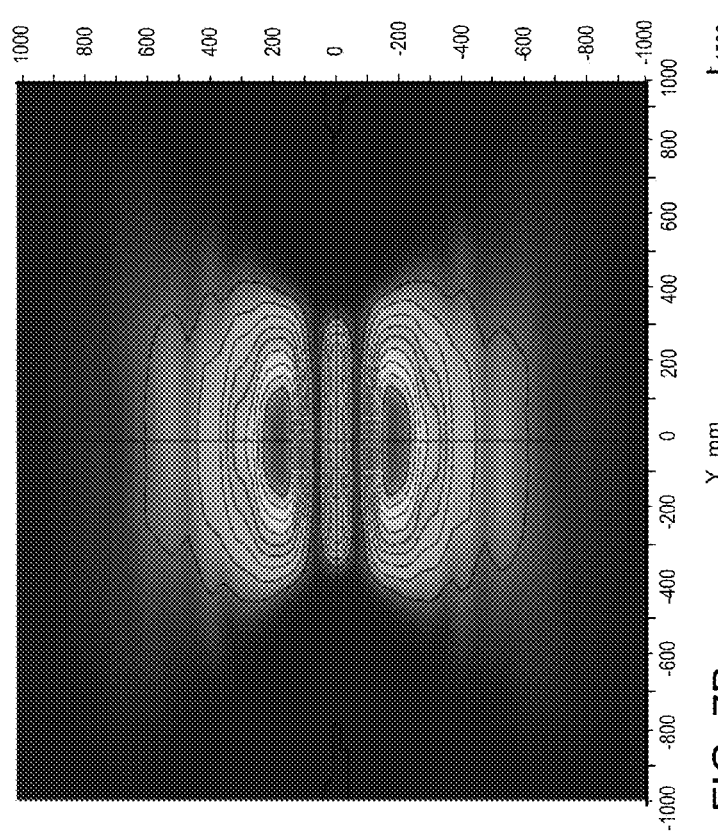

FIG. 7B is a contour plot of a simulated intensity distribution on the ceiling 180 that corresponds to the configuration of the adjustable illumination device 300 shown in FIG. 7A (i.e., partial extension of the luminaire module) and the intensity profile shown in FIG. 5. The y-axis of the plot shown in FIG. 7B refers to the illumination distribution in the longitudinal direction of the adjustable illumination device 300 (y-axis in FIG. 2A) and the x-axis of the plot refers to the illumination distribution in the transverse direction of the adjustable illumination device 300 (x-axis in FIG. 2A).

FIG. 7C is a cross section plot of a simulated intensity distribution in the transverse direction (x-axis) of the adjustable illumination device 300. The second axis of the plot shown in FIG. 7C refers to illuminance (lux) in the transverse direction of the adjustable illumination device 300. In this example, the illuminance between a distance of −900 and +900 mm from the adjustable illumination device in transverse direction reaches up to 4,750 lux.

Figure 7D:
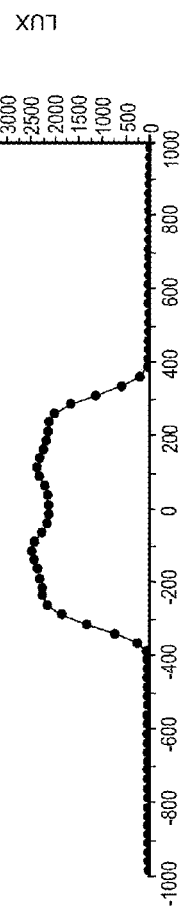

FIG. 7D is a cross section plot of a simulated intensity distribution in the longitudinal direction (y-axis) of the adjustable illumination device 300. The second axis of the plot shown in FIG. 7D refers to illuminance (lux) in the longitudinal direction of the adjustable illumination device 300. In this example, the illuminance between a distance of −375 and +375 mm from the adjustable illumination device along the longitudinal direction reaches up to 2,400 lux.

Figure 8A:
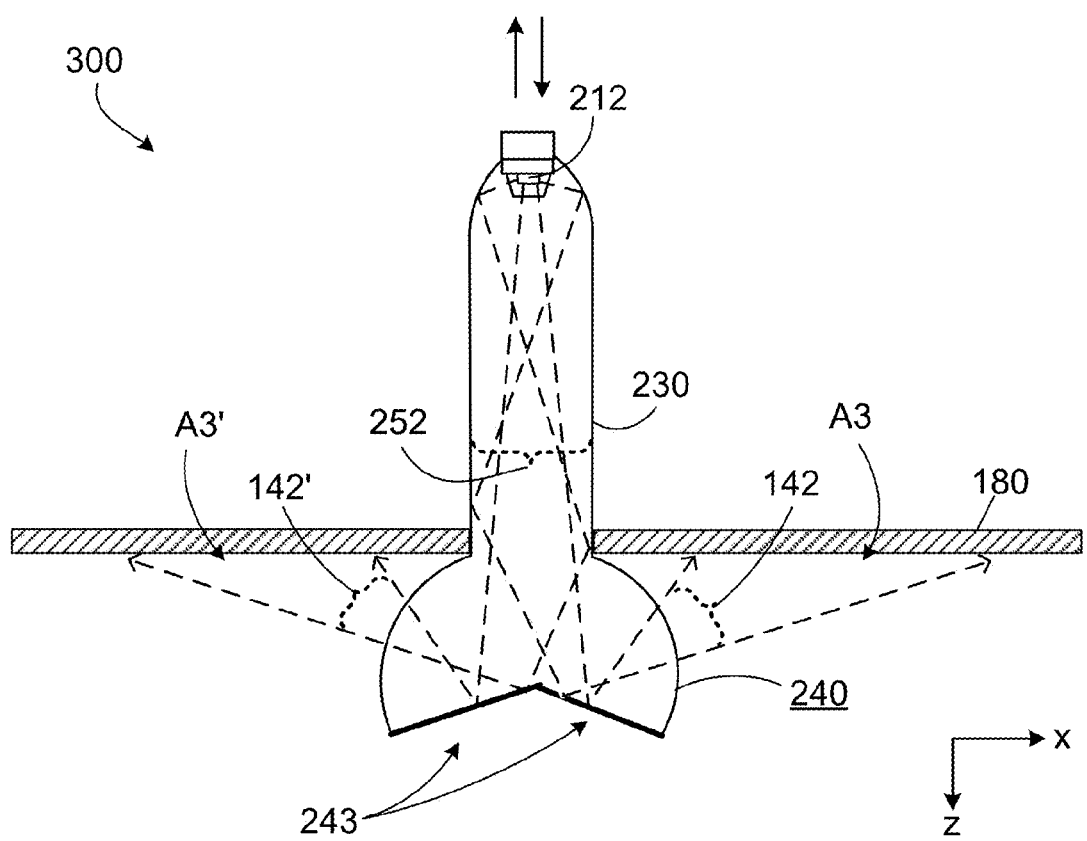

FIG. 8A is an example of the adjustable illumination device 300 with a further retracted luminaire module. The secondary optic 240 is at about 50 mm distance to the ceiling 180. In this example, the adjustable illumination device 300 illuminates areas A3, A3' of the ceiling 180 are smaller than the areas A2, A2'. Areas A3, A3' are smaller areas since the secondary optic 240 is positioned at about 50% distance to the ceiling 180.

FIG. 8B is a contour plot of a simulated intensity distribution on the ceiling 180 that corresponds to the configuration of the adjustable illumination device 300 shown in FIG. 8A (i.e., full retraction of the luminaire module) and the intensity profile shown in FIG. 5. The y-axis of the plot shown in FIG. 8B refers to the illumination distribution in the longitudinal direction of the adjustable illumination device 300 (y-axis in FIG. 2A) and the x-axis of the plot refers to the illumination distribution in the transverse direction of the adjustable illumination device 300 (x-axis in FIG. 2A.)

FIG. 8C is a cross section plot of a simulated intensity distribution in the transverse direction (x-axis) of the adjustable illumination device 300. The second axis of the plot shown in FIG. 8C refers to illuminance (lux) in the transverse direction of the adjustable illumination device 300. In this example, the illuminance between a distance of −600 and +600 mm from the adjustable illumination device in transverse direction reaches up to 7,500 lux.

FIG. 8D is a cross section plot of a simulated intensity distribution in the longitudinal direction (y-axis) of the adjustable illumination device 300. The second axis of the plot shown in FIG. 8D refers to illuminance (lux) in the longitudinal direction of the adjustable illumination device 300. In this example, the illuminance between a distance of −350 and +350 mm from the adjustable illumination device along the longitudinal direction reaches up to 2,500 lux.

FIGS. 6D, 7D, and 8D show that the illumination of the ceiling 180 remains substantially above 2000 lux along the elongate dimension of the adjustable illumination device 300 (i.e., the length of the adjustable illumination device 300 defined by the Y coordinate) even though the extension of the luminaire module (i.e., the distance of the secondary optic 240 to the ceiling 180) varies. However, the illumination of the ceiling 180 along the X coordinate varies dependent on the extension of the luminaire module. For example, as shown in FIG. 6C, the adjustable illumination device 300 with a fully extended luminaire module illuminates the ceiling 180 at above 500 lux to about 600 mm in the X direction from the adjustable illumination device 300. In comparison, as shown in FIG. 8C, the adjustable illumination device 300 with a fully retracted luminaire module illuminates the ceiling 180 at above 500 lux to about 400 mm in the X direction from the adjustable illumination device 300.

Figure 9A:
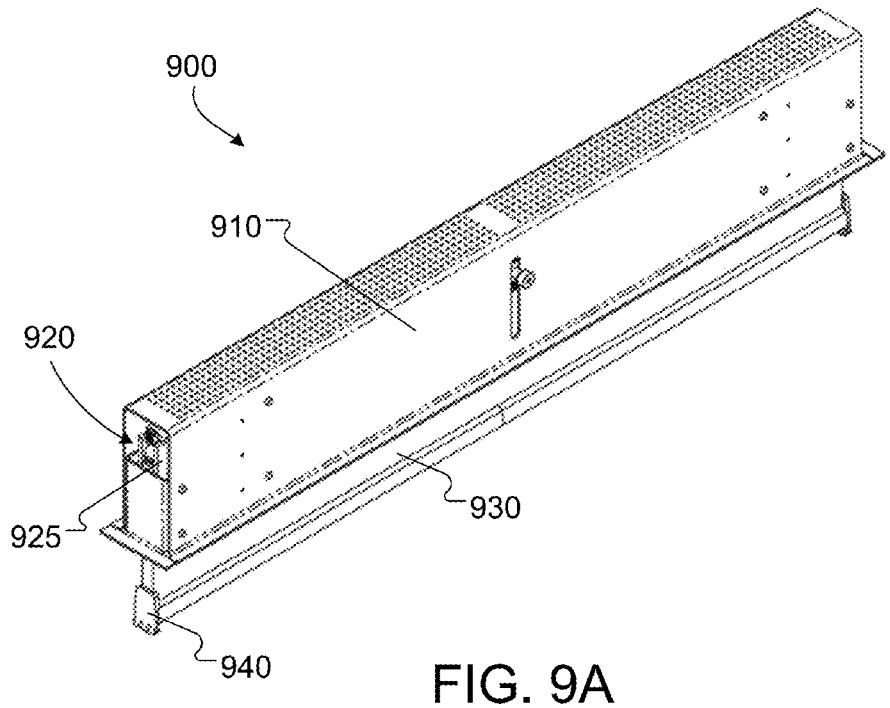
FIGS. 9A-9B are perspective views of an example of an adjustable illumination device with an in-ceiling mounting structure.
Figure 9B:
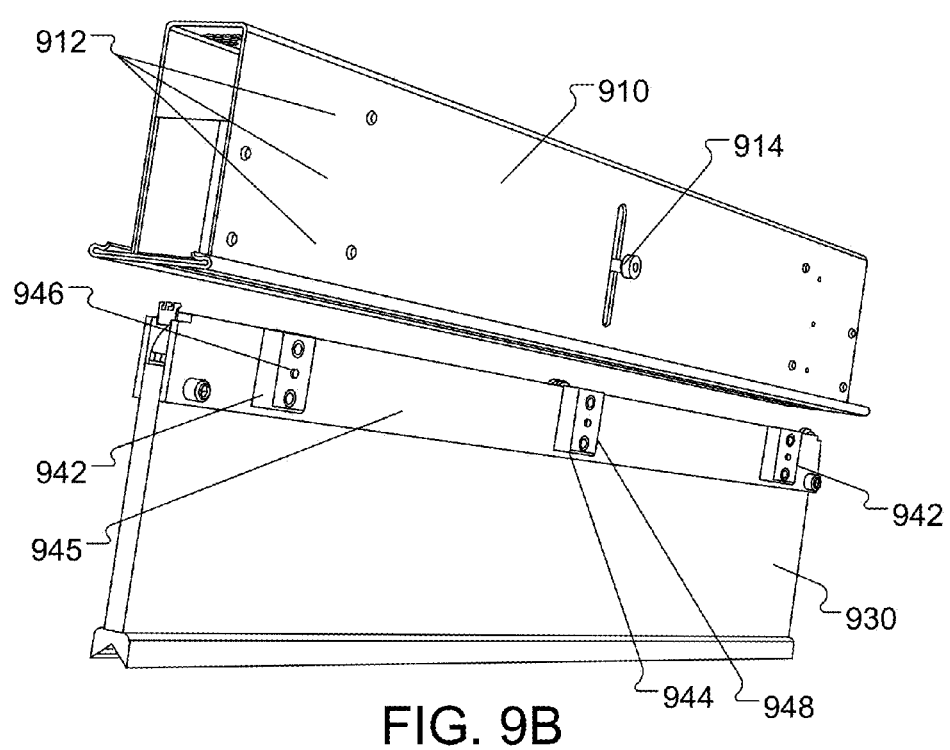

In general, the mounting structure that allows for adjustment of the position of the luminaire module relative to the ceiling (or other background area) can be configured in different ways. An example of a mounting structure for an elongate luminaire module is shown in FIGS. 9A-9B. Here, an adjustable illumination device 900 includes a housing 910 that allows for mounting the adjustable illumination device to a ceiling. The adjustable illumination device 900 includes a luminaire module 930 (e.g., having a structure similar to luminaire module 200), the housing 910, and a sliding mechanism 920 for adjusting an extension of the luminaire module 930 relative to the housing 910. The luminaire module 930 can be moved relative to the housing 910 (e.g., the luminaire module can be slid back and forth in the housing to extend or retract the luminaire module.) In some implementations, one or more tools 940 can be used to push/pull the luminaire module 930 into and out of the housing 910. The one or more tools 940 can be permanently or removably coupled with the luminaire module at one or more locations. For example, such tools can be arranged at opposite ends with respect to the length of the light guide and/or in the center of the light guide proximate the secondary optics. The tool can comprise a tab handle, hook, a spring, or alike. One end of the housing 910 includes a flange that sits flush with the ceiling when the adjustable illumination device is installed in a room. This end includes an opening into which the luminaire module is inserted.

The sliding mechanism 920 includes guide rails 925, guide blocks 942 and 944, spring loaded bolts 946 and openings 912. The openings 912 are configured to allow partial mating with respective spring loaded bolts 946. The spring loaded bolts 946 can have rounded ends for protruding beyond a face of the respective guide blocks 942. The guide block 944 can have an opening 948 that can be configured to receive a screw 914 for securing the luminaire module 930 and limiting its translational movement relative to the housing 910.

The sliding mechanism can be configured such that the spring loaded bolts 946 resiliently engage with the openings 912 when the luminaire module 930 is inserted in the housing 910. Release from the resilient engagement can be achieved by exerting a minimum pull/push force between the luminaire module 930 and the housing 910. Force can be exerted via the removable tool 940, by an electric motor, or any other means suitable to traverse the luminaire module 930.

The guide rails 925 can be located between the guide blocks 942 when the luminaire module 930 is inserted in the housing 910. The fit between the guide blocks 942 and the guide rails 925 can be configured to provide sufficient tolerances and allow for an amount of force imbalance between the removable tools 940 that are located on opposite ends of the luminaire module 930 to avoid jamming during up/down movement. In some implementations, the openings 912 can have a circular, an elongate (parallel to horizontal) or other shape to allow reproducible interlocking even when an offset between the spring loaded bolts 946 and the openings 912 occurs. The guide blocks 942 and 944 can be attached to a rail 945, which can be configured to hold and secure the upper edge of the luminaire module 930.

While in the present example the luminaire module is manually slid relative to the housing in discrete steps, other implementations are also possible. For example, in some embodiments, adjusting the luminaire module 930 (i.e., sliding the luminaire module into and out of the housing) can be performed using a mechanical or electromechanical or other actuator, for example. The actuator can be based on analog or digital control and configured to slide the luminaire module relative to the housing. Such actuators can be configured to allow for remote control of the position of the luminaire module 930. Example actuators can include leadscrews and stepper motors in which the stepper motor drives the leadscrew which then translates rotational movement into a linear movement. To mitigate seizing in long linear systems, multiple actuators and/or extended actuator mechanisms may be disposed along the length of the illumination device, which may be electrically or mechanically synchronized via suitable control signals or one or more synchronization belts, for example.

Furthermore, different luminaire modules can have different heights, i.e., the maximum (and minimum) extension relative to the housing 910 depends on the height of the respective luminaire module.

In some embodiments, the adjustable illumination device can be designed to be retrofitted into an existing light fixture. For example, the adjustable illumination device can include a base connector (e.g., an Edison, bayonet or other type base connector) suitable for attaching to an existing light socket.

FIG. 4 shows an example of an illumination device 400 that includes a hollow luminaire module. The hollow luminaire module can be coupled to the housing via supports (e.g., side supports or guides) that set a separation between the primary optics (or the LEEs) and the secondary optics. The hollow luminaire module can be adjusted within the housing as described in connection to FIG. 9, for example.

While the foregoing example is an elongate luminaire module, other form factors are also possible. For example, referring to FIGS. 10A-10C, an embodiment of an adjustable illumination device 1000 includes an Edison socket connector 1010 that supports a telescoping, rotatable shaft 1020. Shaft 1020 connects to a base 1030 that supports a luminaire module, which includes one or more LEEs and one or more primary optics (neither the LEEs nor primary optics are shown in the figures). The luminaire module also includes a light guide 1040 and secondary optics 1050. The structure of the luminaire module is similar to the luminaire modules described above. The shaft 1020 or the other components may be configured to allow independent rotation of the portions of the adjustable illumination device on either side of the shaft 1020 or the other component to allow rotation of the secondary optics 1050 while maintaining secure connection of the base connector 1010 with a corresponding socket.

Figure 10A:
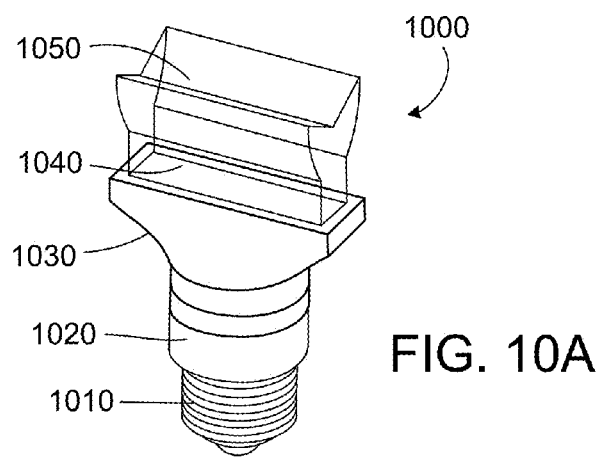
FIGS. 10A-10C are perspective views of an example of an adjustable illumination device that includes a base for connecting to an Edison socket.
Figures 10B, 10C:
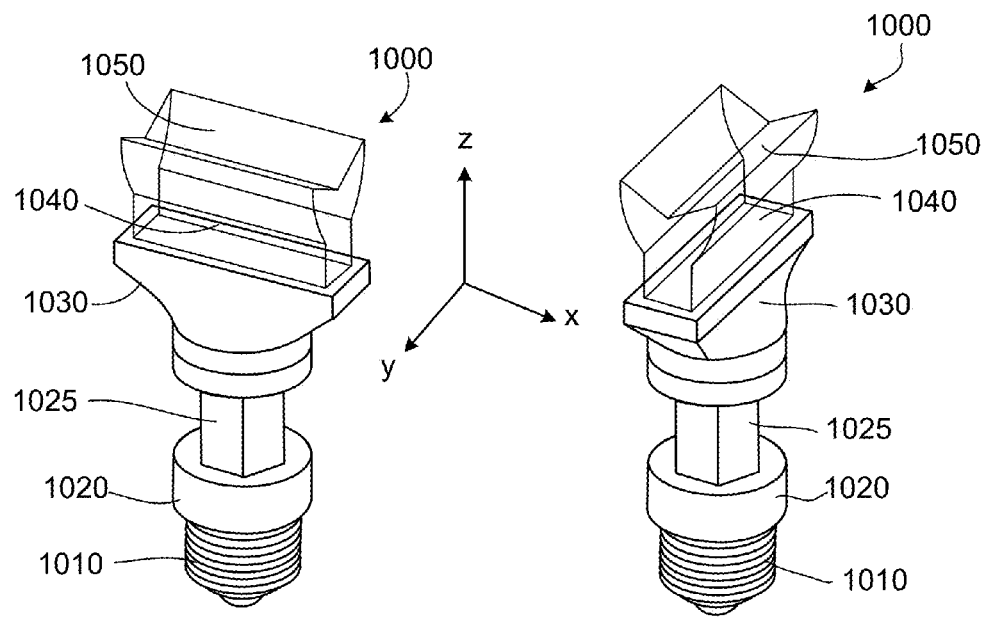

FIG. 10A shows the adjustable illumination device in an un-extended configuration. FIGS. 10B and 10C show the shaft extended, exposing inner shaft section 1025.

As noted previously, shaft 1020 is rotatable, allowing the luminaire module to be rotated about the z-axis of the shown Cartesian coordinate system. In FIG. 10B, the luminaire module extends along the x-axis, while in FIG. 10C the luminaire module is rotated to extend along the y-axis.

Figure 11A:
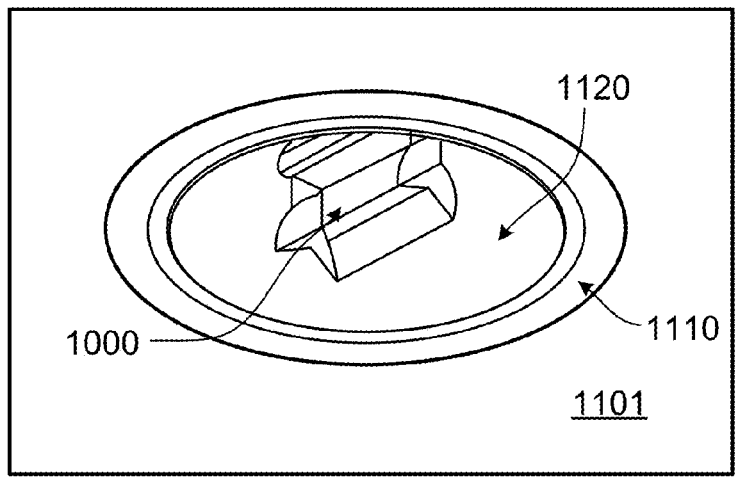
FIGS. 11A-11C are perspective views of an adjustable illumination device mounted in an existing recess fixture.
Figure 11B:
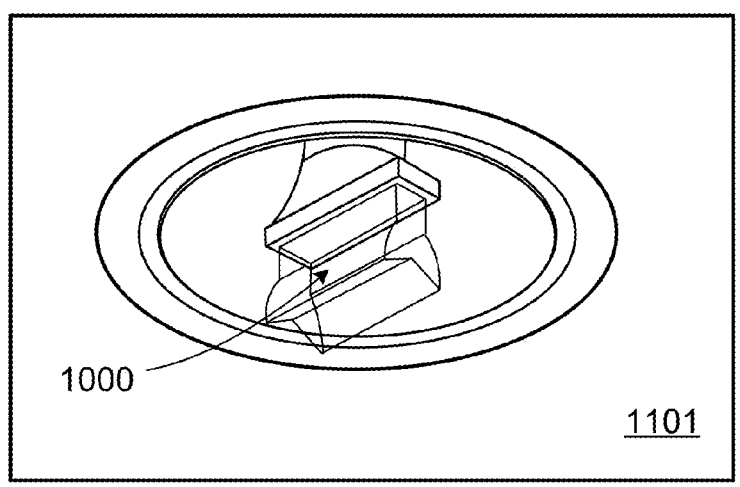
Figure 11C:
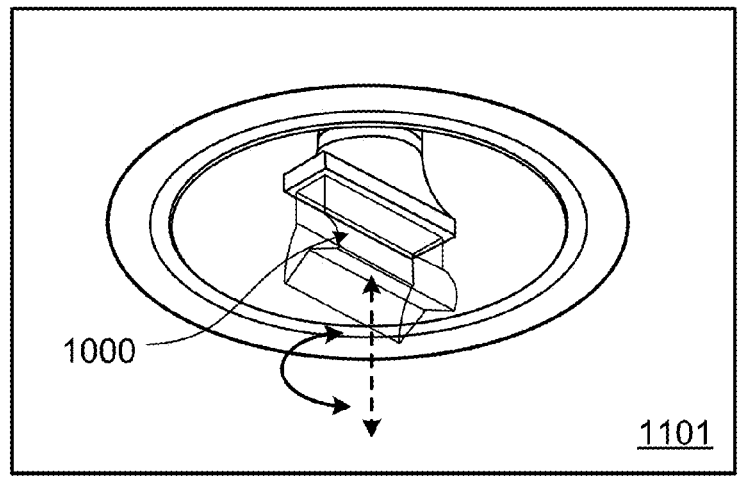

The form-factor of adjustable illumination device 1000 allows it to be installed in existing light sockets. For example, in some embodiments, adjustable illumination device can be installed in a recessed can light as shown in FIGS. 11A-11C. In particular, these figures show adjustable illumination device 1000 installed in a recessed can 1110 in a ceiling panel 1101. The fixture also includes a blocking reflector 1120 that is inserted into the recessed can before adjustable illumination device 1000 is attached. FIG. 11A shows adjustable illumination device 1000 in a recessed posture. FIGS. 11B and 11C show the adjustable illumination device extended so secondary optics 1050 extend below the ceiling. The luminaire module is rotatable in the fixture, as illustrated by FIG. 11C. In some embodiments, the adjustable illumination device 1000 may include a sleeve (not illustrated) configured to cover the opening of the recessed can. Such a sleeve may be resiliently biased towards the base to allow flush alignment with the recessed can. The sleeve may provide a powder coated, polished, brushed or other metallic, white or other color lower surface. The surface of the sleeve may be substantially planar.

Figure 12:
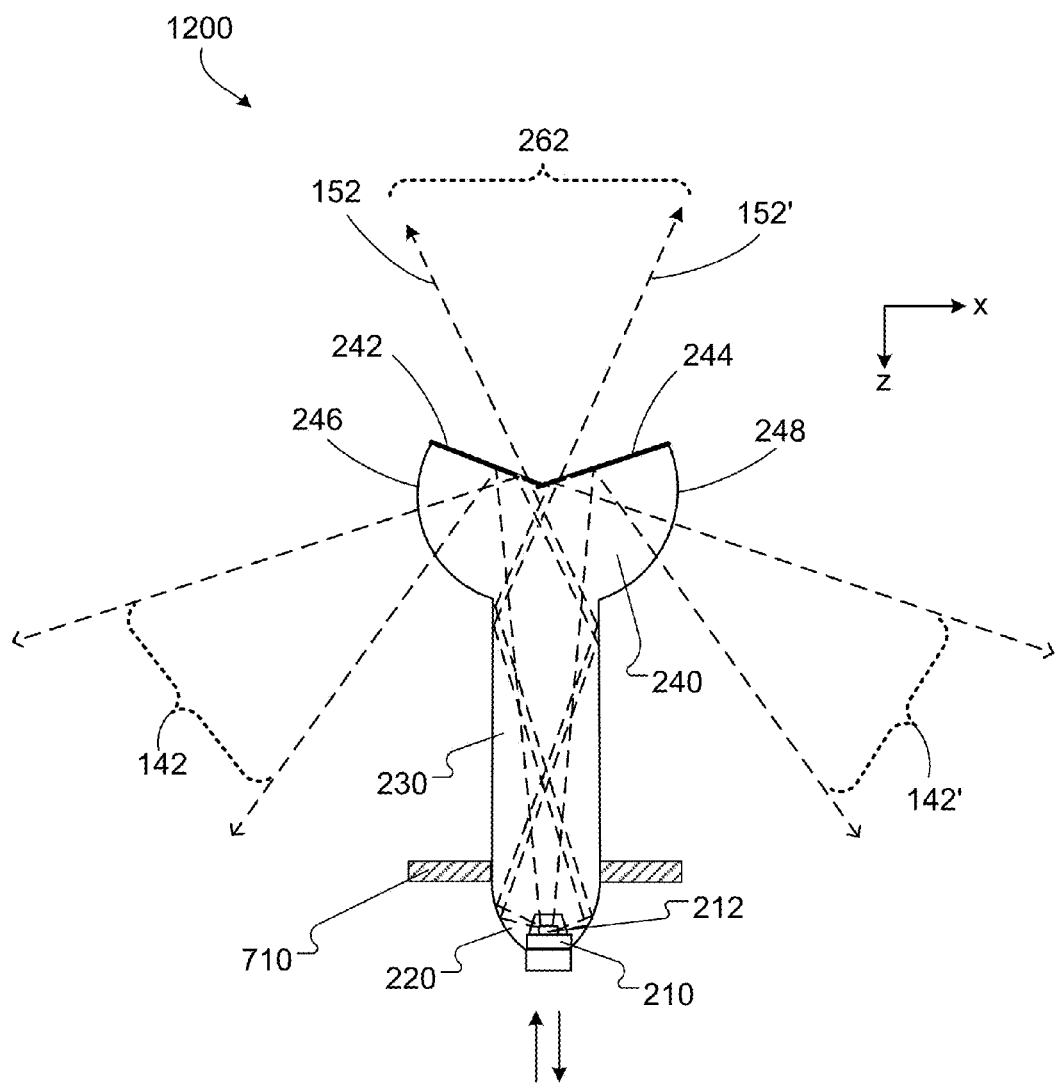
FIG. 12 is a cross-sectional view of another example of a solid embodiment of an adjustable illumination device.

While the foregoing embodiment is designed for connecting to an Edison socket, other standard bases can also be used (e.g., a bayonet base). Furthermore, while the foregoing examples are ceiling-mounted adjustable illumination devices, other form factors are also possible. For example, illumination devices can be used in an upright configuration where the LEEs are positioned underneath the secondary optic. FIG. 12 shows a cross-section of an adjustable illumination device 1200 that can be configured, for example, for use as a desk lamp or pedestal lamp. In this example, the adjustable illumination device 1200 includes a solid embodiment of the luminaire module, such as luminaire module 200 described above in connection with FIG. 2A. Further in this example, a position of the luminaire module can be adjusted relative to a housing 710 to which the luminaire module is coupled.

As described above in connection with FIG. 2A, the luminaire module 200 can output light in angular ranges 142 and 142'. In this example, the light output in angular ranges 142, 142' illuminates the target space (e.g., a desk or the floor 190). In some implementations, the luminaire module 200 is configured to output light in angular range 262 as described above in connection with FIG. 2A. In this example, the light output in angular range 262 illuminates the background area (e.g., the ceiling 180.)

As described herein, the luminaire module 200 includes a mount 210 and multiple LEEs 212. The LEEs 212 can be coupled with the mount 210. The luminaire module 200 includes primary optics 220 (e.g., optical couplers corresponding to the LEEs 212), the light guide 230, and the secondary optic 240 (e.g., an optical extractor). A portion of the light that is guided by the light guide 230 in a collimated angular range to the secondary optic 240 is redirected by a first portion 242 of a redirecting surface and then output from the secondary optic 240 of the luminaire module 200 through a first output surface 246. Another portion of the light received at the secondary optic 240 in the collimated angular range is redirected by a second portion 244 of the redirecting surface and then output from the secondary optic 240 of the luminaire module 200 through a second output surface 248. A mounting frame and attachment brackets can be used to position/attach the luminaire module 200 inside the housing 710 to provide a device for target space illumination, for example.

Figure 13:
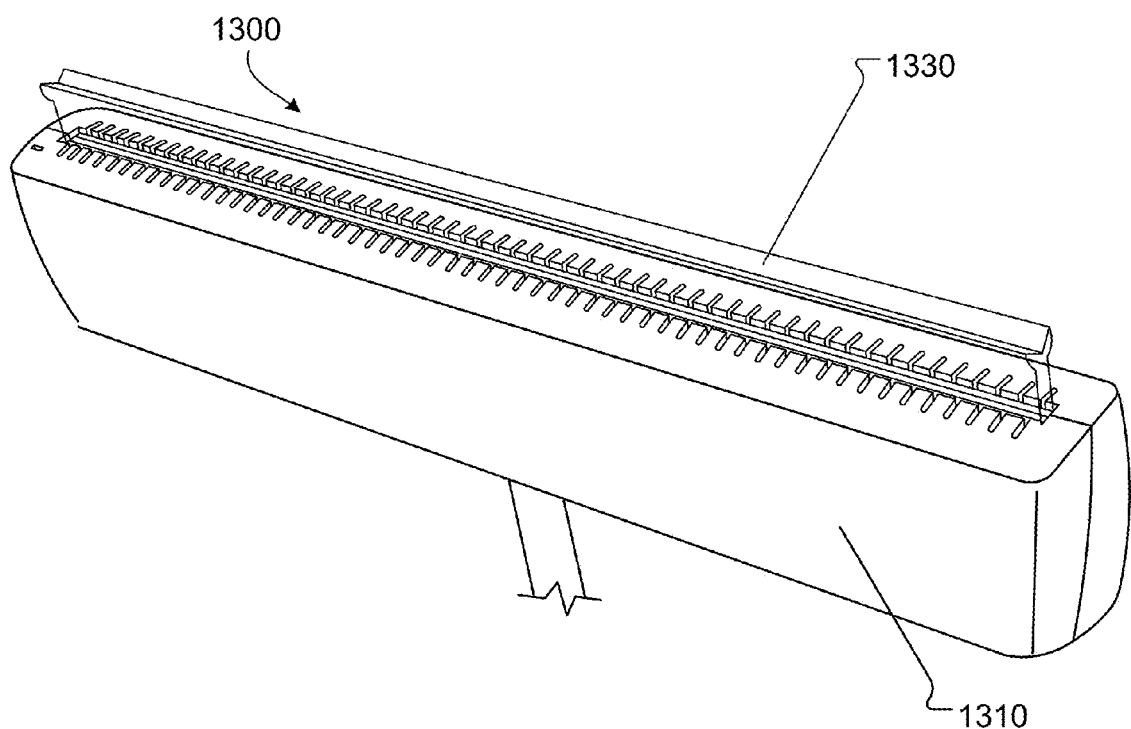
FIG. 13 is a perspective view of an example of an adjustable illumination device configured as a desk lamp or floor lamp.

FIG. 13 shows an example of an adjustable illumination device 1300 configured as a lamp (e.g., a desk lamp or pedestal lamp). The adjustable illumination device 1300 includes a luminaire module 1330 (e.g., such as luminaire module 200) and a housing 1310 to which the luminaire module 1330 is coupled. The adjustable illumination device 1300 also includes a sliding mechanism (e.g., a sliding mechanism as described in connection with FIG. 9) for adjusting an extension of the luminaire module 1330 relative to the housing 1310. In some embodiments, the housing 1310 can be supported by a stand (e.g., a floor stand or a desk stand.)

In some implementations, the luminaire module 1330 can be extended and retracted electro-mechanically, for example by stepwise or continuous actuators (not illustrated). In some implementations, the housing 1310 can include sockets (e.g., similar to conventional light bulbs) so that the housing 1310 can be screwed into a base to allow electrical and/or mechanical interconnection with the environment.

The term "light-emitting element" (LEE), also referred to as a light emitter, is used to define any device that emits radiation in one or more regions of the electromagnetic spectrum from among the visible region, the infrared region and/or the ultraviolet region, when activated. Activation of an LEE can be achieved by applying a potential difference across components of the LEE or passing a current through components of the LEE, for example. A light-emitting element can have monochromatic, quasi-monochromatic, polychromatic or broadband spectral emission characteristics. Examples of light-emitting elements include semiconductor, organic, polymer/polymeric light-emitting diodes (e.g., organic light-emitting diodes, OLEDs), other monochromatic, quasi-monochromatic or other light-emitting elements. Furthermore, the term light-emitting element is used to refer to the specific device that emits the radiation, for example a LED die, and can equally be used to refer to a combination of the specific device that emits the radiation (e.g., a LED die) together with a housing or package within which the specific device or devices are placed. Examples of light emitting elements include also lasers and more specifically semiconductor lasers, such as vertical cavity surface emitting lasers (VCSELs) and edge emitting lasers. Further examples include superluminescent diodes and other superluminescent devices.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, so long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. An illumination device comprising:
   a housing having an opening elongated along a first direction;
   an adjustable mount attached to the housing; and
   a luminaire module coupled to the housing via the adjustable mount, the luminaire module comprising:
     a plurality of light-emitting elements (LEEs) adapted to emit light;
     a light guide positioned to receive, at an input end of the light guide, light from the LEEs and adapted to guide in a forward direction the received light to an output end of the light guide, the forward direction being orthogonal to the first direction, wherein the light guide comprises a pair of side surfaces which (i) extend in the forward direction between the input end and the output end, and (ii) are arranged parallel to the first direction; and
     an optical extractor optically coupled with the light guide at the output end to receive light from the light guide, the optical extractor comprising at least one redirecting surface elongated along the first direction and one or more output surfaces, each being elongated along the first direction and curved in a cross-section orthogonal to the first direction, the at least one redirecting surface being adapted to reflect at least a portion of the light received at the optical extractor towards the corresponding one or more output surfaces, the one or more output surfaces being configured to output into the environment of the optical extractor in backward directions, the light reflected from the corresponding redirecting surface, each of the backward directions having a component opposite the forward direction and another component along a second direction, the second direction being orthogonal to both the forward direction and the first direction, wherein the LEEs and at least a portion of the light guide are recessed within the housing and the adjustable mount allows adjusting a distance between the one or more output surfaces of the optical extractor and the opening of the housing.

2. The illumination device of claim 1, wherein the luminaire module further comprises one or more primary optics
positioned to receive light emitted by at least some of the LEEs,
adapted to at least partially collimate the light from the at least some LEEs, and
optically coupled at an input end of the light guide.

3. The illumination device of claim 1, wherein the at least one redirecting surface is partially transmissive for the light received from the light guide.

4. The illumination device of claim 1, wherein the at least one redirecting surface reflects substantially all of the light received from the light guide.

5. The illumination device of claim 1, wherein the housing comprises a mounting structure adapted to mount the illumination device in a ceiling so that adjusting the position between the optical extractor and the opening of the housing varies a distance between the optical extractor and the ceiling.

6. The illumination device of claim 1, wherein the adjustable mount comprises an electrometrical actuator adapted to move the luminaire module relative to the housing.

7. The illumination device of claim 1, wherein the adjustable mount is a manually adjustable mount.

8. The illumination device of claim 1, further comprising a stand for supporting the housing during operation of the illumination device.

9. The illumination device of claim 8, wherein the stand is a floor stand or a desk stand.

10. The illumination device of claim 1, wherein the housing comprises a connector for connecting the illumination device to a standard light socket.

11. The illumination device of claim 10, wherein the adjustable mount is adapted to translate the luminaire module relative to the connector.

12. The illumination device of claim 1, wherein the illumination device is sized to attach to a recessed can ceiling fixture.

* * * * *